United States Patent [19]

Nick

[11] Patent Number: 4,506,504
[45] Date of Patent: Mar. 26, 1985

[54] ELECTRONIC FUEL CONTROL SYSTEM FOR GAS TURBINE

[75] Inventor: Charles F. Nick, Lufkin, Tex.

[73] Assignee: Dresser Industries, Inc, Dallas, Tex.

[21] Appl. No.: 481,089

[22] Filed: Mar. 31, 1983

[51] Int. Cl.³ .............................................. F02C 9/28
[52] U.S. Cl. ............................................... 60/39.281
[58] Field of Search ..................................... 60/39.281

[56] References Cited

U.S. PATENT DOCUMENTS

| | | | |
|---|---|---|---|
| 3,098,356 | 7/1963 | Joline | 60/39.281 |
| 3,686,859 | 8/1972 | White | 60/39.281 |
| 3,936,226 | 2/1976 | Harner et al. | 60/39.281 |
| 4,432,201 | 2/1984 | Hawes | 60/39.281 |

OTHER PUBLICATIONS

Woodward Governor Co., "43027 Electronic Control, 8230-340, Part 2, Operation and Calibration, 1981.

Primary Examiner—Louis J. Casaregola
Attorney, Agent, or Firm—Daniel Rubin

[57] ABSTRACT

An electronic engine control for a gas turbine monitors a plurality of speed and temperature parameters. For each of the parameters a setpoint signal is produced that can be either fixed or variable and which is compared against the parameter signal to produce a difference signal proportional to the amplitude and rate of change of the difference between the parameter and setpoint signal.

A gas generator minimum control signal is high selected with a power turbine minimum speed signal. The resulting high selected signal is then low selected with the power turbine average temperature and gas generator control signals. A low selection provides for fuel control to drive the most extreme variable parameter back to its setpoint by means of a feedback loop to an output driver circuit within a fuel valve card. The selected control signal is passed through a maximum speed integrator and a feedback loop to set the position of the fuel valve while feedback signals to two feedback loops are provided by a valve position signal monitoring a valve actuator. Failure to eliminate offset of the power turbine temperature signal from the power turbine temperature average for more than a fixed time produces a deviation signal to effect turbine shut down.

5 Claims, 32 Drawing Figures

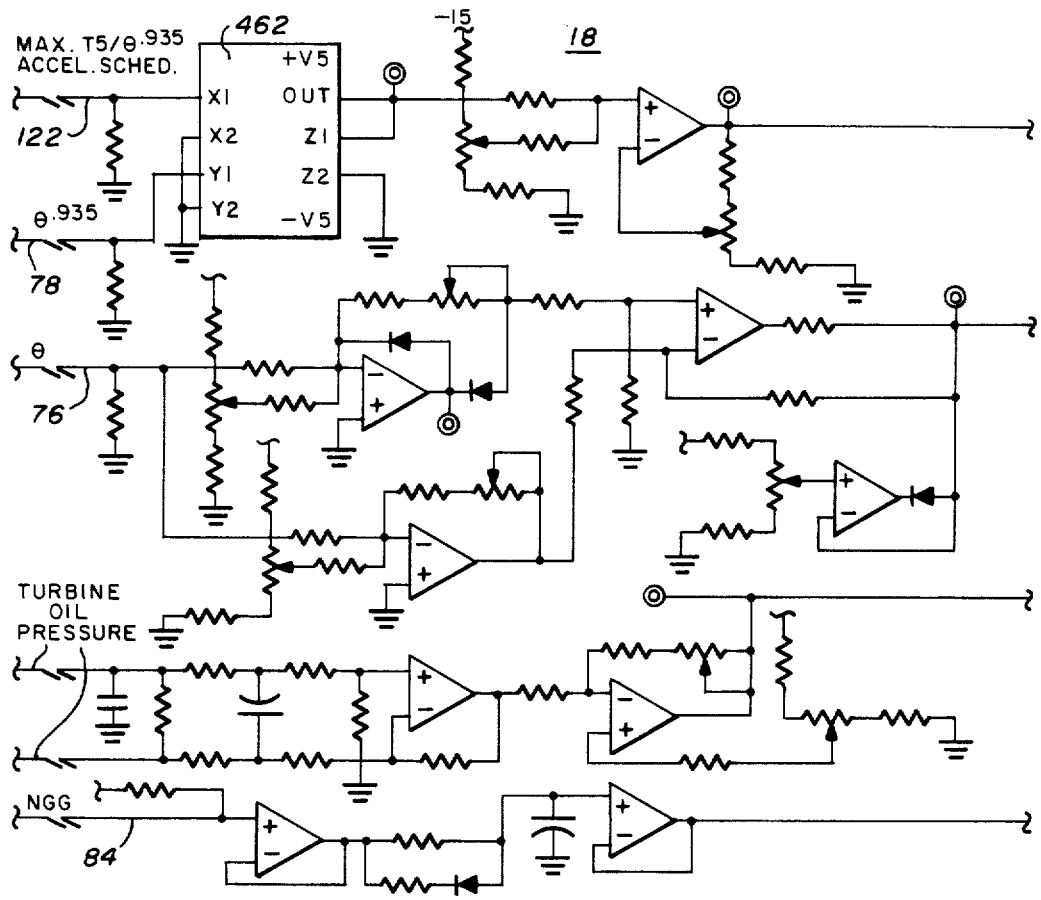
FIG. 6a
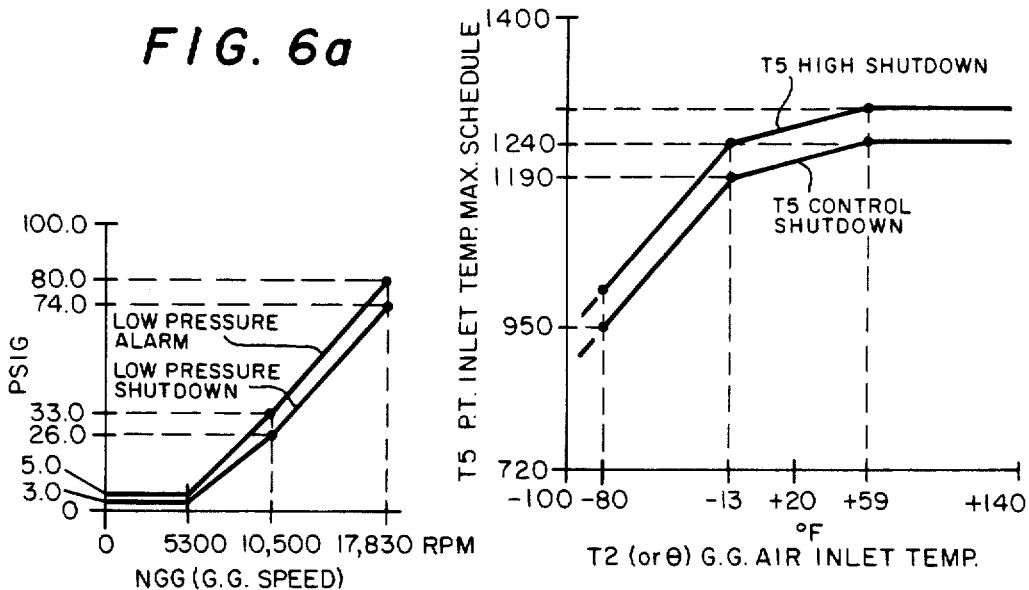
FIG. 8
FIG. 7

4,506,504

1

ELECTRONIC FUEL CONTROL SYSTEM FOR GAS TURBINE

BACKGROUND OF THE INVENTION

The gas turbine engine can operate efficiently and reliably only when a substantial number of important parameters are maintained within desired operating limits. The transition operation of the turbine must be carefully controlled in regard to thermal changes as well as acceleration and deceleration. The primary control feature for the gas turbine is regulation of the fuel control valve. It is therefore essential that the fuel valve be rapidly and accurately controlled to respond to the critical operating parameters as well as to any requirements for a particular application.

In view of these requirements there exists a need for an electronic engine control for a gas turbine which can accurately monitor the critical operating parameters of the turbine, respond to the operating parameters in reference to predefined operating curves to control the operation of the gas turbine fuel valve and monitor the control circuit itself together with the parameter sensors and turbine equipment to detect a failure and initiate a shutdown of the turbine.

SUMMARY OF THE INVENTION

A selected embodiment of the present invention comprises an electronic engine control for operating a fuel valve of a gas turbine. The engine control includes circuitry for monitoring a plurality of gas turbine parameters to produce corresponding parameter signals, circuitry for generating a setpoint signal for each of the parameter signals and circuitry for comparing each of the parameter signals with the corresponding setpoint signals to produce a difference signal. An amplitude selector circuit receives the difference signals and selects one of the difference signals. A summation circuit receives the selected difference signal at a first input and produces the control signal at the output. An output driver circuit is connected to receive the control signal and produce a fuel valve control signal for setting the position of the fuel valve. Additional circuitry is provided for monitoring the fuel valve position to produce a valve position signal. Additional circuit means are provided for receiving the valve position signal and inputting it to the second input of the summation circuit thereby forming a feedback loop for positioning the fuel valve in response to the selected difference signal.

In a further aspect of the present invention there is provided a means for detecting the failure of a fuel valve or associated equipment by monitoring the output of a differential amplifier included within the output driver circuit.

In a further aspect of the present invention there is provided a means for monitoring the temperature conditions of the gas turbine. A plurality of turbine temperatures are averaged to produce an average temperature signal. Circuitry is provided for generating a temperature deviation signal when one of the temperature signals differs from the average temperature signal by more than a predetermined amount for more than a predetermined time.

BRIEF DESCRIPTION OF THE DRAWINGS

For a more complete understanding of the present invention and the advantages thereof, reference is now made to the following description taken in conjunction with the accompanying Drawings in which:

FIGS. 6a and 6b are a schematic illustration of the power turbine inlet temperature maximum schedule card as shown in FIGS. 1a–1c;

FIG. 7 is a graph of the maximum schedule power turbine inlet temperature as a function of the gas generator inlet temperature;

FIG. 8 is a graph of turbine lube oil pressure as a function of the gas generator speed;

DETAILED DESCRIPTION OF THE INVENTION

Figure 1A:
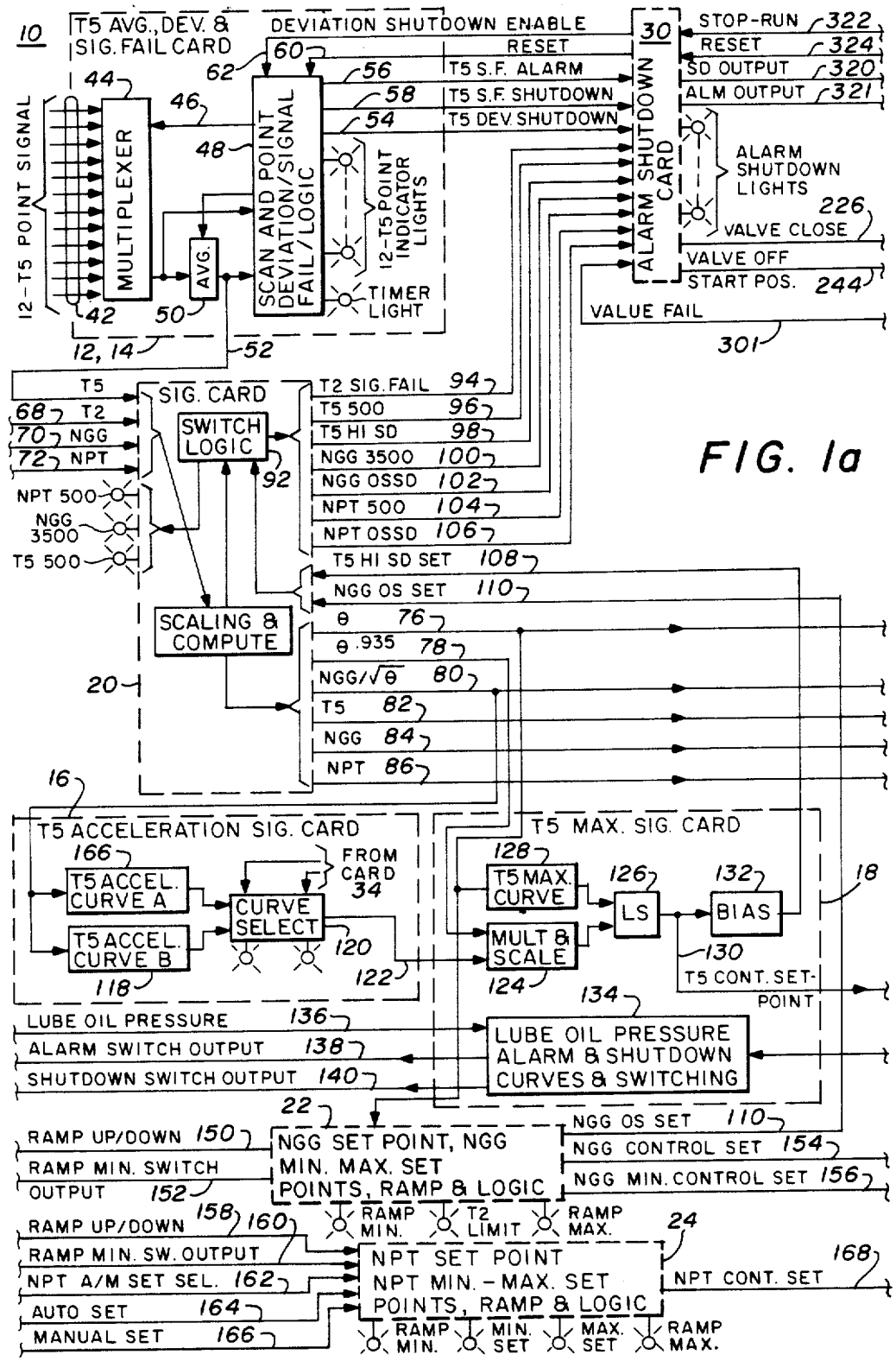
FIGS. 1a, 1b and 1c illustrate a functional block diagram of the electronic fuel control system of the present invention.
Figure 1B:
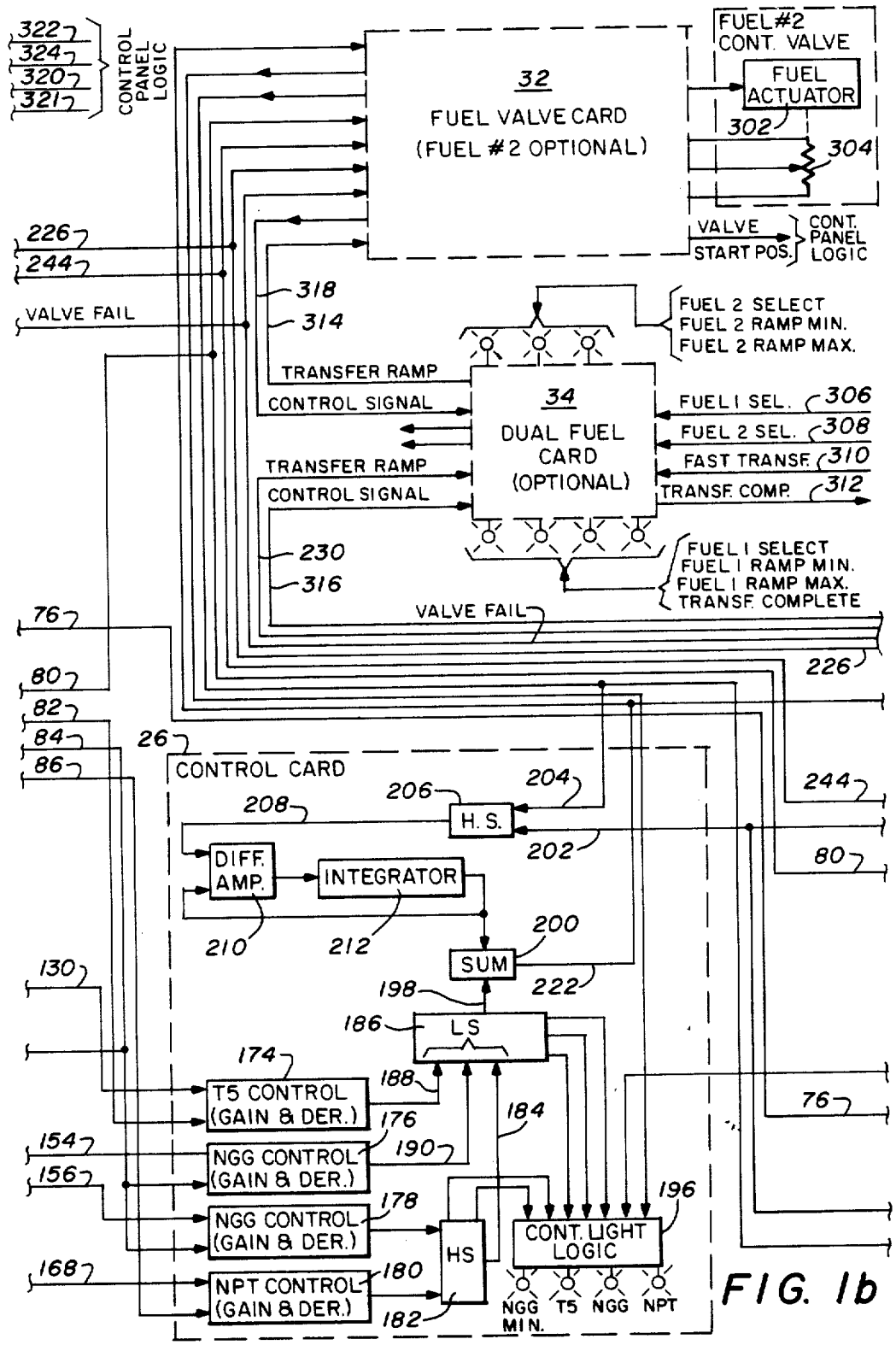
Figure 1C:
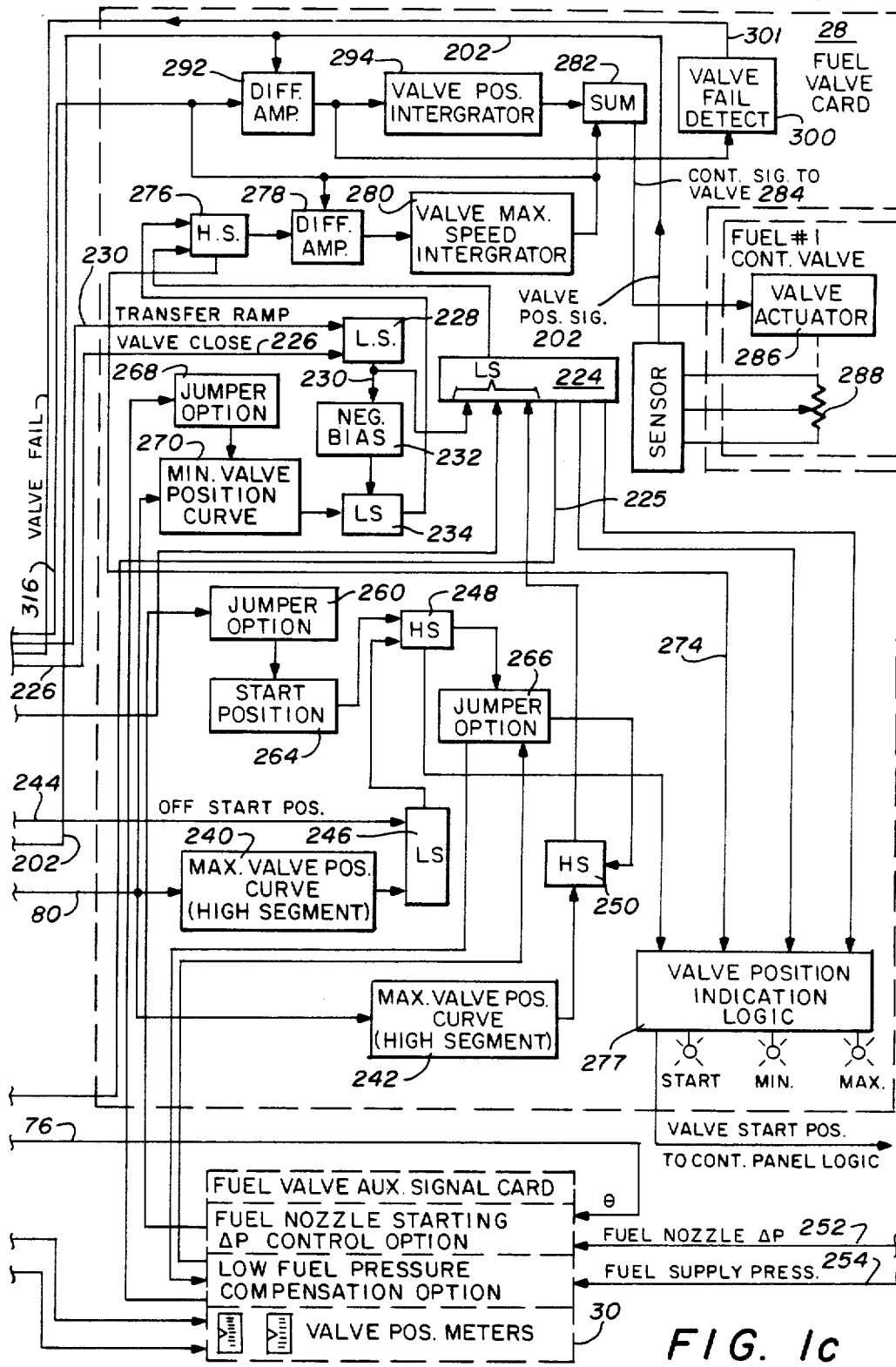

The gas turbine electronic fuel control system of the present invention is illustrated as a functional block diagram in FIGS. 1a, 1b and 1c. A single fuel control system utilizes 11 circuit cards and a dual fuel system requires an additional two optional cards. Each of the functions of the fuel control system essentially corresponds to the circuitry for a particular card, therefore the operation of the fuel control system of the present invention will be described in reference to the various circuit cards.

The most commonly used symbols in the present description are listed below with the respective definition:

T2—Gas generator air inlet temperature. This is input as a 1–5 volt signal for −82 +150° F., and is internally converted to a function $\theta$ in range of 0–10 volts for 0°–600° R (corresponds to −460 +140° F.).

T5—Power turbine inlet temperature. This signal is input as 12 separate 1–5 volt signals for 0°–1800° F. These points are averaged and then converted to a 0–10 volt average signal for 0°–1800° F.

NGG—Gas generator speed, this is input as a 1–5 volt signal for 0–20,000 rpm and is converted to a 0–10 volt signal for the same rpm range.

NPT—Power turbine speed. This is input as a 1–5 volt signal for 0–8000 rpm and is converted to a 0–10 volt signal for the same rpm range.

$\theta$—Function of T2, internally generated, 0–10 v range.

$\theta^{.935}$—This is a function derived from the $\theta$ function and is in the range of 0–10 volts.

The purpose of the electronic fuel control system of the present invention is to position the fuel control valve for a gas turbine engine to control the operation of the turbine during starting, acceleration, deceleration and steady-state on-line conditions.

Referring to FIGS. 1a, 1b and 1c, the electronic fuel control system of the present invention is described in general with the reference numeral 10. The control system 10 includes 11 basic circuit cards and two optional cards. The names and reference numerals for each of these cards is listed below.

12—Power turbine inlet temperature (T5) average card.

14—Power turbine inlet temperature (T5) deviation/- signal fail card.

16—Power turbine inlet temperature (T5) acceleration schedule card.

18—Power turbine inlet temperature (T5) maximum schedule card.

20—Input signals (T2, T5, NGG, NPT) level conversion and switch logic card.

22—Gas generator speed (NGG) setpoint card.

24—Power turbine speed (NPT) setpoint card.

26—T5, NGG, NPT control card.

28—Fuel valve card.

30—Fuel valve auxilliary signal card.

32—(Optional) fuel valve card (fuel #2).

34—(Optional) dual fuel card.

A gas turbine engine which may be controlled by the electronic fuel control system of the present invention is, for example, a model DC-990, manufactured by Dresser Clark Division of Dresser Industries.

Further referring to FIGS. 1a–c there are typically 12 T5 monitor points within the gas turbine engine. These 12 temperatures are input through lines 42 to a multiplexer 44. The multiplexer 44 is controlled through a line 46 from a scan and point deviation/signal fail logic circuit 48. The multiplexer 44 selectively inputs the temperature signals, one by one, into an average circuit 50 which produces an average of the T5 signals. The average T5 signal is transmitted through a line 52 to the card 20.

The logic circuit 48 examines each of the T5 input signals for signal deviation and signal fail. A signal is deemed to be in deviation if it is more than a fixed offset, such as 100° F., from the average. If a signal is in deviation for more than a predetermined time period, typically one minute, a T5 deviation shutdown signal is generated and transmitted through a line 54 to the alarm shutdown card 30.

If any one of the T5 signals goes to an extreme limit, substantially beyond deviation, it is deemed to be a signal fail. A signal fail typically indicates failure of a temperature sensor. When such a failure occurs and after a time delay, a T5 signal fail alarm signal is sent through a line 56 to the alarm shutdown card 30. However, there is no shutdown applied until there have been a fixed number of signal fails. When this occurs, a T5 signal fail shutdown signal is transmitted through a line 58 to the alarm shutdown card 30 to cause a shutdown of the gas turbine. The alarm and shutdown signals from the logic circuit 48 are reset by the card 30 through a line 60. A deviation shutdown enable signal is transmitted from card 30 to the logic circuit 48 through a line 62.

Whenever a T5 signal from one of the 12 inputs is deemed to be in either deviation or signal fail, that signal is not included in the averaging process.

The T5 signal at line 52 is input to card 20. Analog inputs for signals T2, NGG and NPT are input respectively through lines 68, 70 and 72. The card 20 scales each of the inputs, which are in a range of 1–5 volts, to a range of 0–10 volts. This is done in a scaling and compute circuit 74. The circuit 74 further calculates other functions. The function $\theta$ is produced and it comprises a signal which is the absolute value of T2. There is also produced in card 20 a signal $\theta^{.935}$. There is calculated a signal NGG divided by the square root of $\theta$. These three signals are transmitted respectively through lines 76, 78 and 80. The level converted signals T5, NGG and NPT are transmitted through lines 82, 84 and 86.

A switch logic circuit 92 monitors the four input signals and generates a number of switched outputs. If the T2 signal goes to an extreme limit, a T2 signal fail signal is generated at a line 94. When the T5 signal exceeds 500° F., a corresponding signal is generated at line 96. When the T5 average signal exceeds a fixed maximum, a shutdown signal is generated at line 98. A signal is generated at a line 100 when the gas generator speed exceeds 3500 rpm. An overspeed shutdown signal is generated at line 102 when the gas generator speed exceeds a maximum limit. A power turbine speed in excess of 500 rpm is indicated through a line 104. A power turbine overspeed shutdown signal is generated at a line 106 when the power turbine speed exceeds a maximum. A T5 high shutdown set signal is received at a line 108. Likewise, a gas generator overspeed set signal is received at a line 110.

Figure 5:
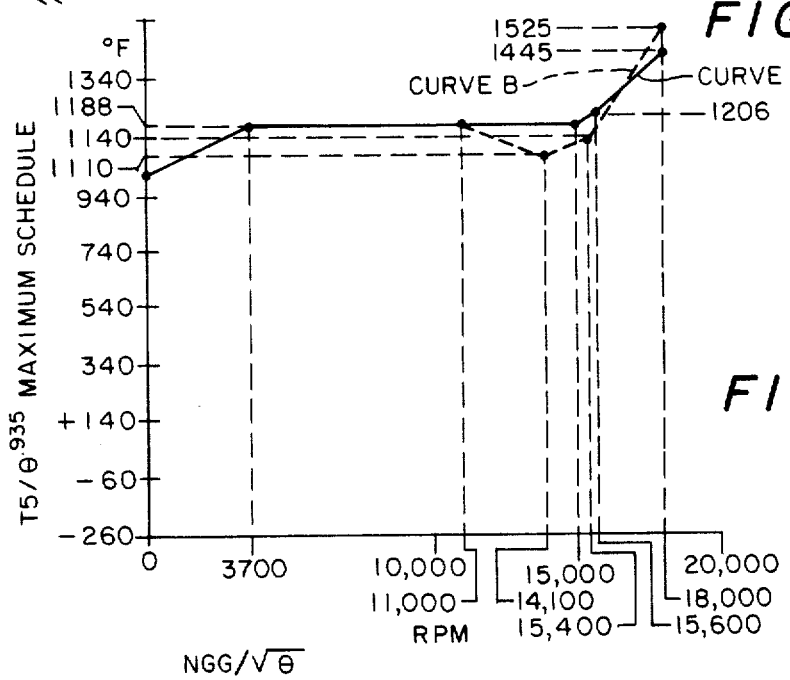
FIG. 5 is a graph of the maximum schedule power turbine inlet temperature as a function of gas generator speed and a function $\theta$.

The function signal at line 80 is transmitted to card 16 for use in T5 acceleration curve circuits A and B which are designated by reference numerals 116 and 118. These curves are generated by the card circuitry and an example of such curves is shown in FIG. 5. The outputs of the curve circuits 116 and 118 are input to a curve selector circuit 120 which can be programmed from card 34 to select either of the curve circuits 116 and 118. The selection of one curve is displayed by lights driven by the curve select circuit 120. Two such curves may be used in a dual fuel system.

The output from card 16 is a function signal comprising $T5/\theta^{.935}$. The signal is transmitted through a line 122 to the card 18.

The signal transmitted through line 122 is provided to a multiply and scale circuit 124 which also receives the $\theta^{.935}$ signal through line 78. These two signals are multiplied to produce the T5 signal which is provided as a first input to a low select circuit 126. A T5 max curve circuit 128 receives the $\theta$ signal through line 76 and produces a T5 maximum signal which is provided as the second input to the low select circuit 126. The curve for the T5 max curve circuit 128 is shown in FIG. 7. The low amplitude signal selected by circuit 126 is the T5 control setpoint signal which serves to drive the fuel control valve of the gas turbine in response to T5 temperature. This signal is transmitted through a line 130. The signal at line 130 is also transmitted through a bias circuit 132 to produce the T5 high shutdown set signal on line 108.

A lube oil circuit 134 is also included in card 18. This circuit receives a lube oil pressure signal at a line 136 and produces an alarm switch output at line 138 and a shutdown switch output at line 140. These two outputs are related only to lube oil functions and not to the fuel control function.

Card 22 provides the gas generator setpoint signal for ramp up, ramp down and on-line operation. The term ramp up means to accelerate the gas turbine and ramp down means to decelerate the gas turbine. The command to carry out one of these functions is transmitted from a control panel through a line 150. The card 22 produces a ramp minimum switch output signal which is transmitted through a line 152. This signal indicates to the control panel that the ramp is at minimum for start permissive purposes.

The card 22 further establishes setpoint for the gas generator speed. This is a function of the ambient temperature as indicated by the $\theta$ signal received through line 76. The ramp minimum, T2 limit and ramp maximum conditions are shown by indicator lights driven by card 22. The card 22 produces the gas turbine speed, NGG, overspeed set signal which is transmitted through line 110 to card 20.

Figure 12:
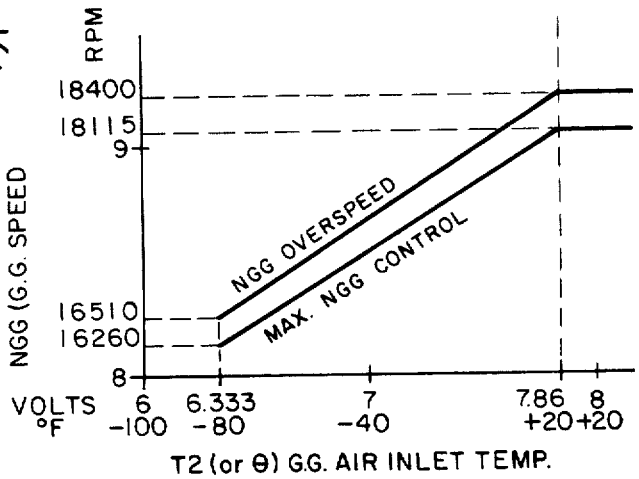
FIG. 12 is a graph of gas generator overspeed and maximum control speed as a function of gas generator air inlet temperature.

Card 22 further produces an NGG control set signal which is transmitted through a line 154 to card 26. Card 22 produces an NGG minimum control set signal which is transmitted through a line 156 to card 26. The NGG set point curve for card 22 is illustrated in FIG. 12.

Still referring to FIG. 1, card 24 provides the power turbine, NPT, control setpoint signal. An input command from a control panel provides a ramp up or ramp down signal through a line 158. The card 24 indicates a minimum ramp condition through an output line 160. An input through a line 162 from the control panel selects whether an automatic or manual power turbine setpoint will be utilized by circuit 24. An automatic setpoint signal is input through a line 164. A manual setpoint is input through a line 166. The automatic setpoint signal can be utilized in an application which requires a changing turbine speed. The circuit 24 also drives indicator lights to show when the control system is in a ramp minimum, a ramp maximum or that the gas turbine is at a minimum setpoint or a maximum setpoint. The circuit 24 produces the NPT control setpoint signal at a line 168.

The control card 26 has four control circuits which provide gain and derivative action. These are T5 control 174, NGG control 175, NGG minimum control 178 and NPT control 180. The T5 control circuit 174 receives the T5 control setpoint signal on line 130 and compares that to the T5 signal at line 82. The NGG control circuit 176 receives the NGG control setpoint signal on line 154 and the NGG signal on line 84. The NGG minimum control circuit 178 receives the NGG minimum control setpoint signal at line 156 as well as the NGG signal on line 84. The NPT control circuit 180 receives the NPT control setpoint signal at line 168 and the NPT signal at line 86. Each of these control circuits determines the difference between the two inputs and produces a corresponding output which is also a function of the rate of change of the difference of the inputs.

The outputs of the control circuits 178 and 180 are input to a high select circuit 182 which passes the higher amplitude input through an output line 184 to a low select circuit 186.

The output of the T5 control circuit 174 is transmitted through a line 188 to the low select circuit 186. The output of the NGG control circuit 176 is transmitted through a line 190 to the low select circuit 186.

The function of the low select circuit 186 is basically to select the control signal which calls for the minimum fuel consumption. However, due to the possible occurrence of a condition under light load when the power turbine speed drops to a level that causes an excessively low gas generator speed, there is provided the high select circuit 182 between the outputs of control circuits 178 and 180. This prevents the gas generator from dropping to an excessively low speed under low turbine load conditions.

Outputs are provided from the high select circuit 182 and the low select circuit 186 to a control light logic circuit 196 to indicate which of the control signals is driving the fuel control valve. These indicator outputs are NGG MIN., T5, NGG and NPT.

The output of the low select circuit 186 is transmitted through a line 198 to a summation circuit 200. A valve position signal is received through a line 202 for the fuel number 1 control valve. A valve position signal is received through a line 204 for an optional second fuel control valve. The signals in lines 202 and 204 are input to a high select circuit 206 which provides the higher amplitude input to a line 208. Line 208 is connected to the first input of a differential amplifier 210. The output of the amplifier 210 is transmitted to an integrator 212. The output of integrator 212 is provided as the second input to the differential amplifier 210 and is also the second input to the summation circuit 200. The fuel control valve for the fuel in use will have the highest amplitude valve position signal and it is this signal that is transmitted to the differential amplifier 210. This signal is integrated and held by the integrator 212. The control loop for driving the fuel control valve seeks to equalize the amplitude of the output of the summation circuit 200 with the output of the integrator 212. Thus, in a steady-state condition the output of the low select circuit 186 is zero. But when any one of the control signals input to card 26 provides an output from the low select circuit 186, the output of the summation circuit 200 is changed thereby activating the fuel valve feedback loop and causing the fuel control valve to change position until the feedback loop is again balanced.

The output from the summation circuit 200 is transmitted through a line 222 to a low select circuit 224 within the fuel valve card 28. A valve close signal is transmitted from the alarm shutdown card 30 through a line 226 to a low select circuit 228. The valve close signal is activated to cause a turn-off of the fuel control valve upon the receipt of an shutdown by card 30. A transfer ramp signal is transmitted through a line 230 from the dual fuel card 34 when there is a transition from one fuel control valve to the other fuel control valve. The output of the low select circuit 228 is high when the system 10 is in a normal operating condition. The output of the low select circuit 228 is transmitted through a line 230 to provide another input to the low select circuit 224 and is passed through a negative bias circuit 232 to provide a first input to a low select circuit 234.

Figure 20:
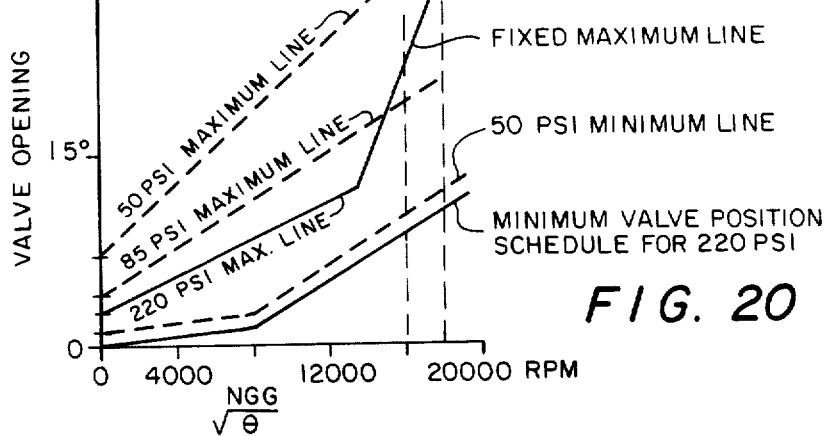
FIG. 20 is a graph of minimum and maximum fuel valve position as a function of NGG over the square root of $\theta$.

Maximum valve position curve circuits 240 and 242 serve to regulate the maximum opening of the fuel control valve. These circuits operate as a function of the NGG over the square root of $\theta$ signal received through line 80. The curves of these circuits are shown in FIG. 20.

The alarm shutdown card 30 generates a valve off start position signal to hold the fuel valve at start position prior to ignition. This signal is transmitted through a line 244 to a low select circuit 246. The output of the maximum valve position curve circuit 240 is provided as a second input to the low select circuit 246. The lower amplitude one of these signals is transmitted to the first input of a high select circuit 248. The output of the maximum valve position curve circuit 242 is transmitted to the first input of a high select circuit 250.

The fuel valve auxilliary signal card 30 has a number of options which can influence the operation of the fuel valve card 28. The inputs to card 30 are the temperature function $\theta$ at line 36, a fuel nozzle $\Delta$ pressure signal at line 252 and a fuel supply pressure signal at a line 254. If a fuel nozzle starting $\Delta$ pressure control option is selected, it is used to provide a more precise fuel valve opening. This control of the fuel valve accurately controls the fuel nozzle $\Delta$ pressure to insure a proper start for the turbine. This option is implemented by a jumper option 260 which connects a line 262 from card 30 to a start position circuit 264. The output of circuit 264 is input to the high select circuit 248 to increase the fuel valve setting.

A further option in card 30 is a low fuel pressure compensation. If the fuel supply pressure is lower than normal, this option is implemented and serves to modify the fuel control valve maximum and minimum limits of the control signals to compensate for the lower fuel pressure. If a jumper option 266 is implemented, the output of the high select circuit 248 is routed to the card 30 where the signal is biased and then returned to the jumper option 266 for input to the high select circuit 250. Normally the output of the high select circuit 248 is transmitted directly to the high select circuit 250. If a jumper option 268 is selected, a bias is transmitted from the card 30 to a minimum valve position circuit 270 to alter the curve thereof.

The card 30 further includes valve position meters to indicate the angular opening of the fuel control valves.

Returning to the fuel valve card 28, the output of the high selector circuit 250 provides the third input to the low select circuit 224. The output of the circuit 224 is input to a high select circuit 276. The second input to the high select circuit 276 is the output of the low select circuit 234. The resulting output of the high select circuit 276 is the desired valve position control signal. The output of circuit 276 is also transmitted through a line 274 to a valve position indicator logic circuit 277. Circut 277 shows which control signal is driving the fuel valve, the start condition and sends a valve start position signal to a control panel.

The output from the high select circuit 276 is provided to the first input of a differential amplifier 278. The output from amplifier 278 is provided to a valve max speed integrator 280. The integrator 280 serves to slow down the speed of control signal to the fuel control valve. The output from the integrator 280 is provided to a summation circuit 282. The output of the summation circuit 282 is transmitted through a line 284 and comprises the control signal which drives a valve actuator 286 that positions the fuel control valve.

A potentiometer 288 measures the valve actuator position and is connected to a sensor circuit 290. The circuit 290 produces the valve position signal which is transmitted through line 202 to provide the first input for the differential amplifier 292. The output of the valve max speed integrator 280 is also provided to the second input of the differential amplifier 278 and the second input of the differential amplifier 292. The output from the amplifier 292 is provided to a valve position integrator 294. The output from the integrator 294 is provided as the second input to the summation circuit 282 to close a feedback loop which extends from the output from the high select circuit 276 to the valve actuator 286.

The feedback loop tends to null the output of the differential amplifier 292 and the output of the integrator 294 when the system is in a steady-state operation. The outputs of the integrator 280 and the valve position signal 202 will be identical in this steady-state condition.

The output of the differential amplifier 292 is also provided to a valve fail detect circuit 300 which produces a valve failure signal if the output of the differential amplifier 292 does not return to the null condition within a fixed time period. The fail signal produced by the valve fail detect circuit 300 is input to the fuel valve card 32 via a line 301.

As noted above, the electronic fuel control system 10 may be implemented with optional cards to provide dual fuel operation. The optional cards are dual fuel card 34 and fuel valve card 32. The fuel valve card 32 is the same as fuel valve card 28, except that it cannot utilize the options provided by card 30. The fuel valve card 32 operates to drive a second valve actuator 302 in the same manner as the valve actuator 286. A potentiometer 304 monitors the position of the valve actuator 302 in the same manner as the potentiometer 288.

The dual fuel card 34 receives the controlling functions for selecting the first fuel, the second fuel, and a transfer between the two fuels. A fuel 1 select signal is input on a line 306, a fuel 2 select signal is input on a line 308 and a fuel transfer signal is input on a line 310. Upon completion of a transfer from one fuel to another, an output command showing transfer complete is generated on a line 312. The signals on lines 306 through 312 are transmitted to a control panel.

The dual fuel card 34 generates a transfer ramp signal to control the rate of transfer from one fuel to the other and transmits this signal through a line 314 to fuel valve card 32 and through a line 230 to fuel valve card 28. A control signal from fuel valve card 28 is transmitted through line 316 to the dual fuel cards 34. A control signal, indicating valve actuator control, is transmitted through a line 318 from the fuel valve card 32 to the dual fuel card 34.

The card 34 has indicator lights to show fuel 1 select, fuel 1 ramp minimum, fuel 1 ramp maximum, transfer complete, fuel 2 select, fuel 2 ramp minimum, and fuel 2 ramp maximum.

Whenever a failure or shutdown condition is encountered, an appropriate signal is transmitted to the alarm shutdown card 30. This card then produces a shutdown output at a line 320 for transmission to the control panel logic and produces a valve close signal at line 226. Card 20 produces an alarm output signal at a line 321 which transmits it to a control panel. Stop-run control signals are transmitted through a line 322 to the alarm shutdown card 30 and a reset signal is likewise sent from the control panel logic through a line 324. The card 30 has a plurality of alarm shutdown lights to indicate failure conditions.

A summary of the operation is now presented for the fuel system 10. The 12 thermocouple inputs at lines 42 are sampled and averaged within cards 12 and 14. The average signal, T5, is input together with the gas generator inlet temperature T2, gas generator speed and power turbine speed to card 20. The signals are then voltage scaled for internal use. Selected switch and alarm outputs are produced by card 20 and transmitted to card 30 as alarm and monitor conditions. Three additional functions are generated by the card 20. These are $\theta$, $\theta^{.935}$ and NGG over the square root of $\theta$. Three parameter signals comprising the T5 average, gas generator speed and power turbine speed are input to the control card 26. Two gas speed control setpoint signals are produced by card 22 and a power turbine setpoint signal is produced by card 24. These are input to the control card 26. A T5 control setpoint is produced by the T5 max schedule card 18 responding to the T5 acceleration card 16. These two cards provide a variable setpoint depending upon the allowable acceleration of the T5 signal.

The four control setpoint signals are input to the respective gain and derivative circuits 174, 176, 178 and 180 in the control card 26. These are compared to the actual conditions monitored through the signals produced by the signal card 20. The outputs of these circuits are essentially selected according to which requires the least fuel consumption. As noted above, there is a low speed comparison to prevent excessively low gas generator speed. The low selected signal is then transmitted to the fuel valve card 28.

Within the fuel valve card 28, the selected control signal is compared to various limiting conditions and then transmitting through the valve actuator 286 to physically control the opening of the fuel control valve. A feedback network is provided to insure that the valve actuator is driven to the desired state and that it is done at an appropriate rate. Selected minimum and maximum valve position curves serve to limit the excursions of the control signal. Initial operating conditions also are included to select starting point fuel control valve operations.

The fuel valve auxiliary signals card 30 provides a number of options to allow selected differential pressure operation under starting conditions and to modify the fuel control operating signals when the turbine is operating with low fuel pressure.

Optional cards 32 and 34 can be included within the system 10 to provide for dual fuel operation. The card 32 is essentially the same as card 28. The card 34 provides a control function for the selection of one or the other of the fuel control valves and for the control necessary to shift from one fuel to the other. Thus, the fuel control system 10 of the present invention provides a means of regulating a gas turbine fuel valve to insure safe and responsive operation of the gas turbine while supplying the minimum fuel required to generate the desired output power.

The electronic fuel control system 10 has been functionally and operationally described in reference to the block diagram shown in FIGS. 1a and 1b. The detail structure of the various circuit cards which make up the system 10 are described in the following material. There is, however, provided no description for the optional cards 32 and 34.

Figure 2A:
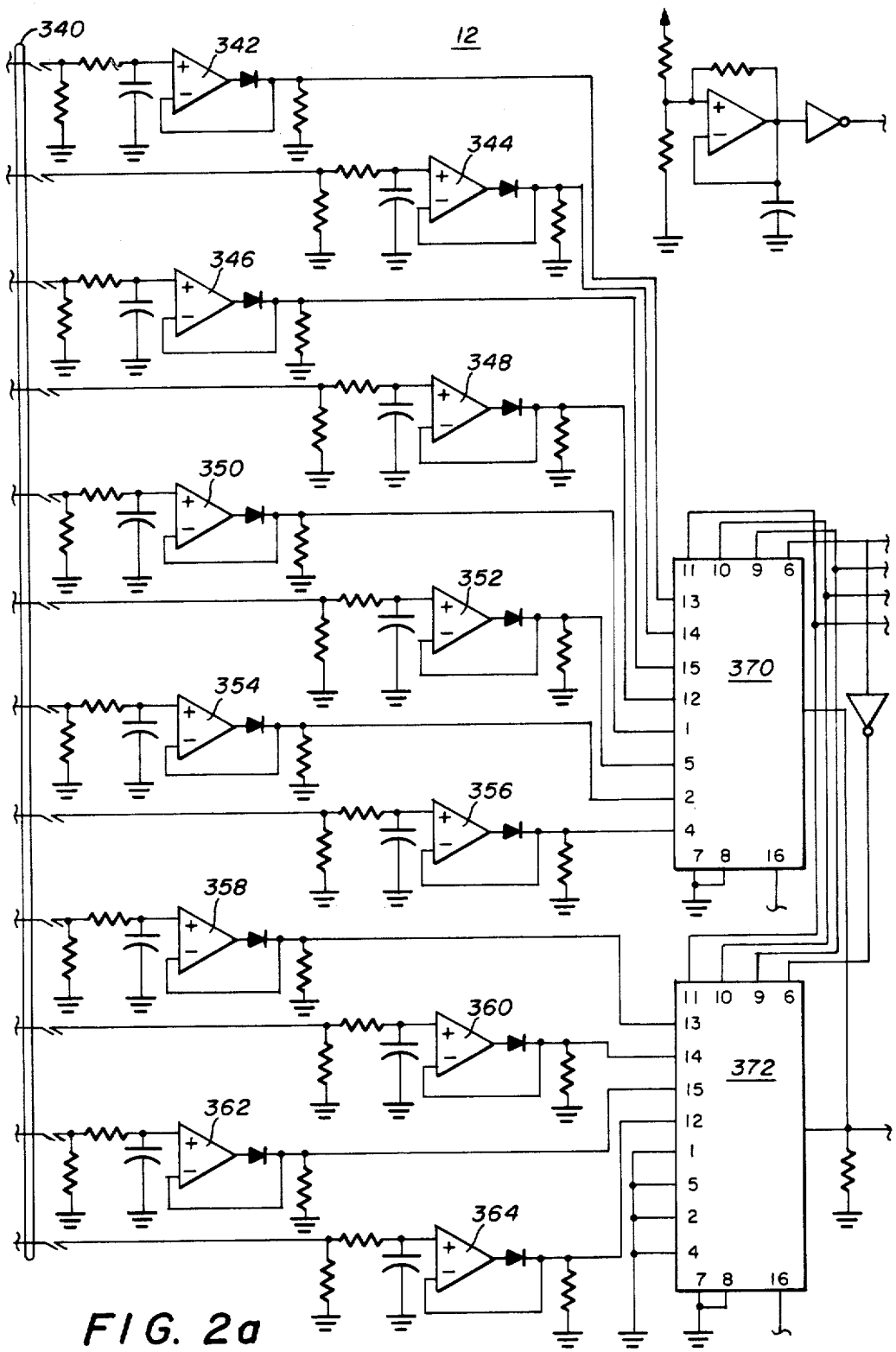
FIGS. 2a and 2b are a schematic illustration of the power turbine inlet temperature average card shown in FIGS. 1a–1c.
Figure 2B:
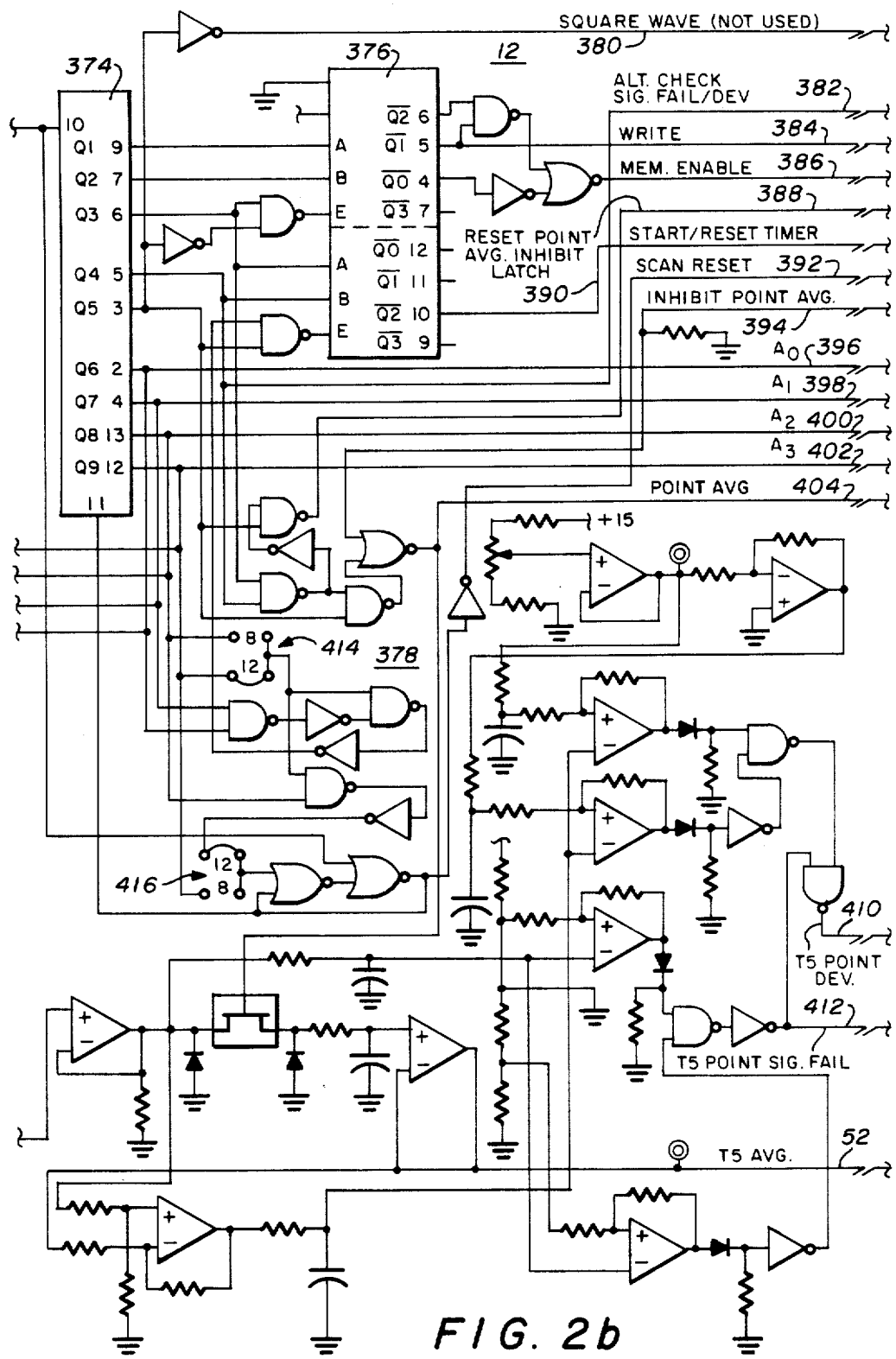

The power turbine inlet temperature, T5, average card 12 is shown in a detailed schematic in FIGS. 2a and 2b. The 12 T5 signals are received from lines 340 and transmitted through respective buffers 342-364 to multiplex circuits 370 and 372. These multiplex circuits can be a model 4051B manufactured by RCA.

The operating sequence of the multiplex circuts 370 and 372 is controlled by a binary counter 374. Counter 374 is preferably a model 4040B manufactured by RCA.

A dual decoder 376 receives various input signals from the binary counter 374 and produces selected control output signals. The binary decoder 376 is preferably a model 4556B manufactured by RCA.

The binary counter 374 and dual decoder 376 work in conjunction with discrete logic 378 to produce the logic control signals on lines 380-404. The lines 382-404 are connected to the T5 deviation/signal fail card 14 shown in FIGS. 3a and 3b.

A T5 point deviation signal is produced at a line 410, a T5 point signal fail signal is produced at line 412 and the T5 average signal is produced at the line 52.

There is included in card 12 jumper options 414 and 416 for selecting eight or twelve temperature sample points. The circuit is shown with the 12 point sampling selected.

Figure 3A:
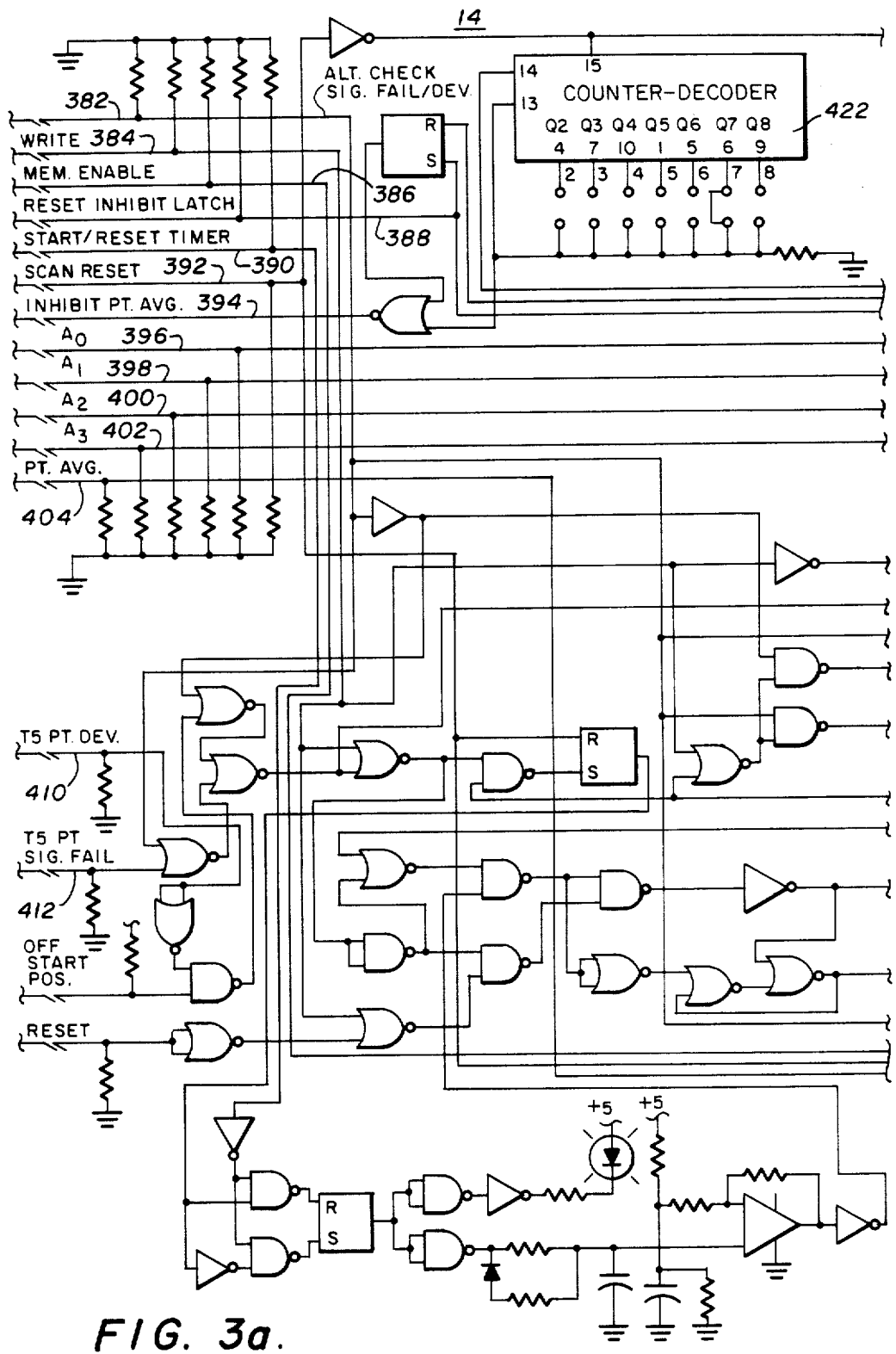
FIGS. 3a and 3b are a schematic illustration of the power turbine inlet temperature deviation/signal fail card shown in FIGS. 1a–1c.
Figure 3B:
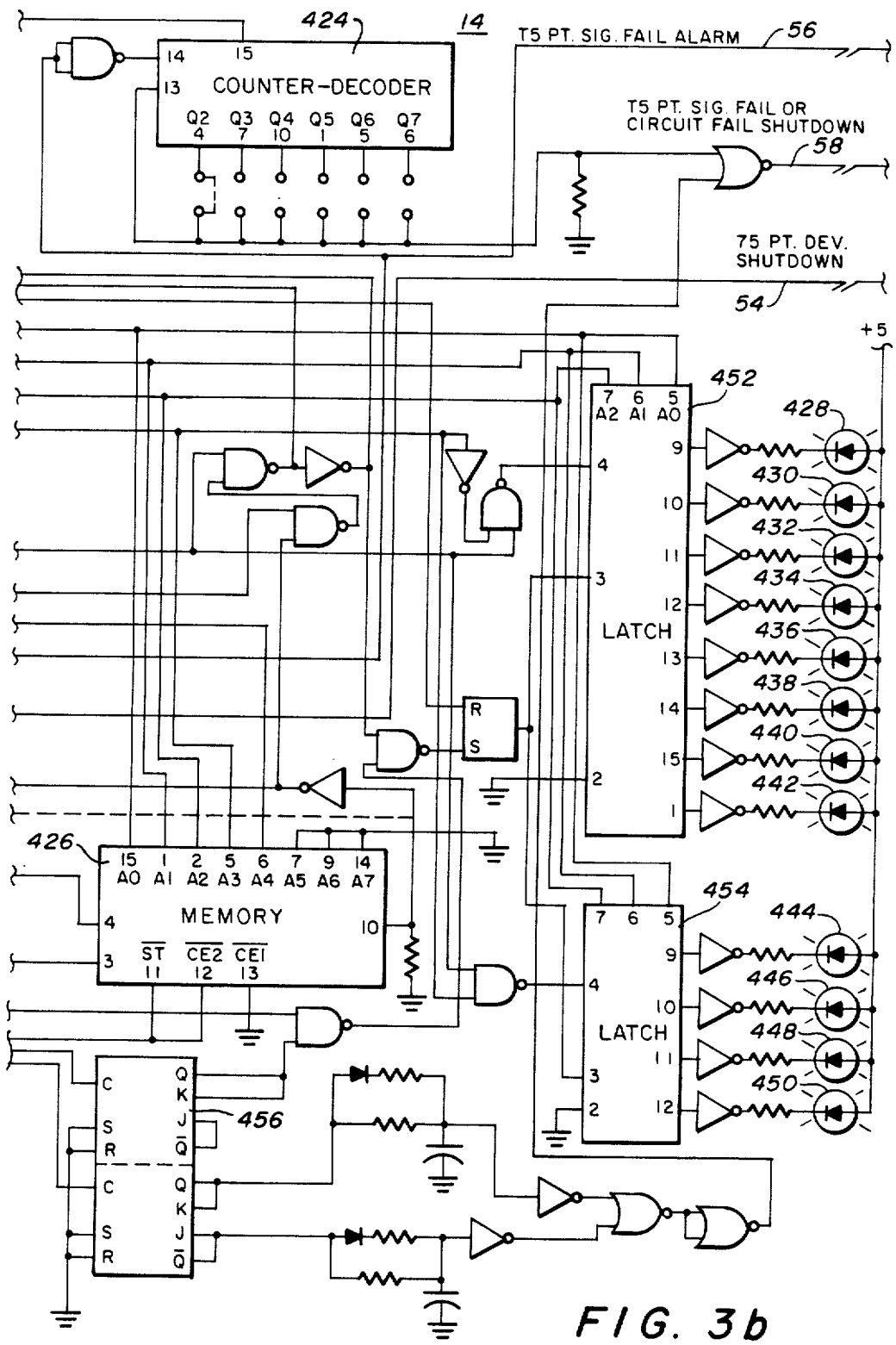

The T5 deviation/signal fail card 14 is shown in FIGS. 3a and 3b. The signals transmitted through lines 382-404 are input to the card 14 at the corresponding lines. Card 14 also receives the signals at lines 410 and 412 from card 12. The card 14 serves to produce the deviation and signal fail signals for the 12 T5 sensors. A counter-decoder 422 has a jumper connected thereto for selecting the maximum number of points that can be inhibited from the temperature averaging process. The counter-decoder 422 is, for example, a model 40178 manufactured by RCA.

A counter-decoder 424 has a group of jumper selection options to determine the number of signal fail points to cause generation of the shutdown signal. The model number of decoder 424 is the same as the model number for decoder 422.

The card 14 further includes a memory 426 which can be a model MCM14537CL manufactured by Motorola.

Card 14 includes twelve T5 signal point failure lamps 428-450. Lamps 428-442 are driven by an addressable latch 452 and lamps 444-450 are driven by an addressable latch 424. A portion of the logic circuit on card 14 is a dual J-K flip-flop 456 which is preferably a model 4027B manufactured by RCA.

Figure 4A:
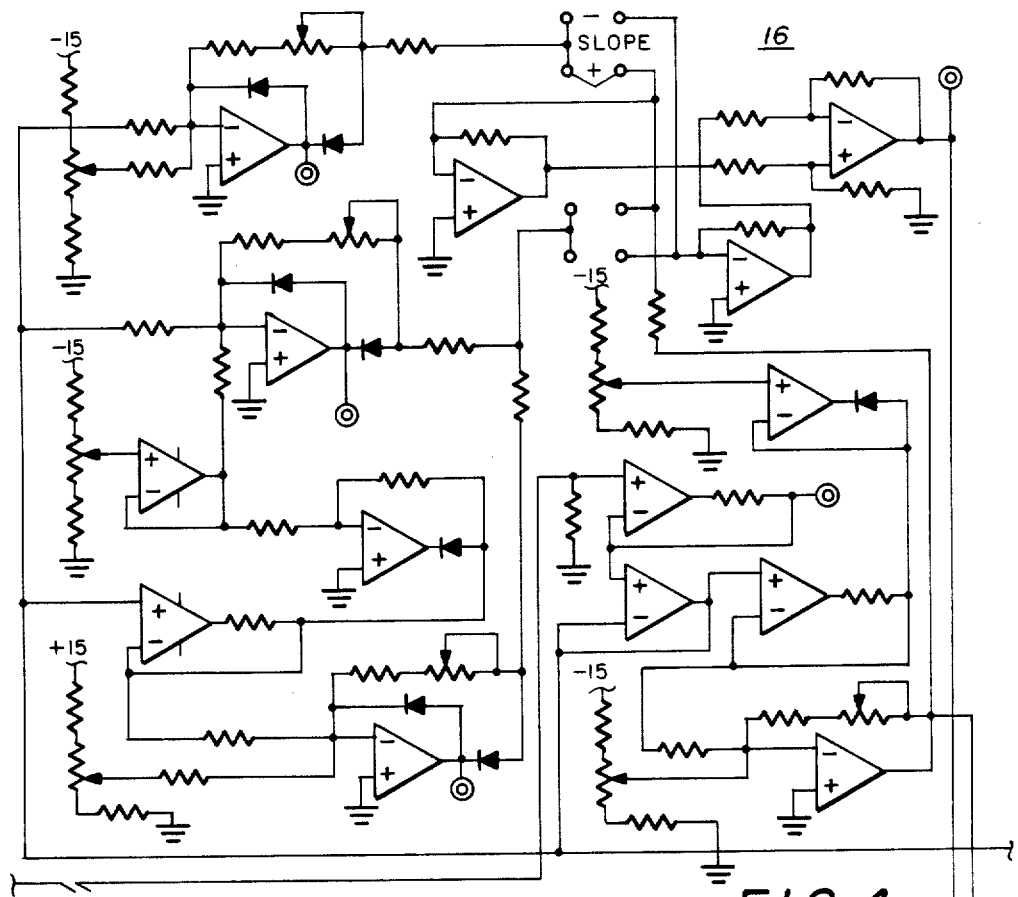
FIGS. 4a and 4b are a schematic illustration of the power turbine inlet temperature acceleration schedule card shown in FIGS. 1a–1c.
Figure 4B:
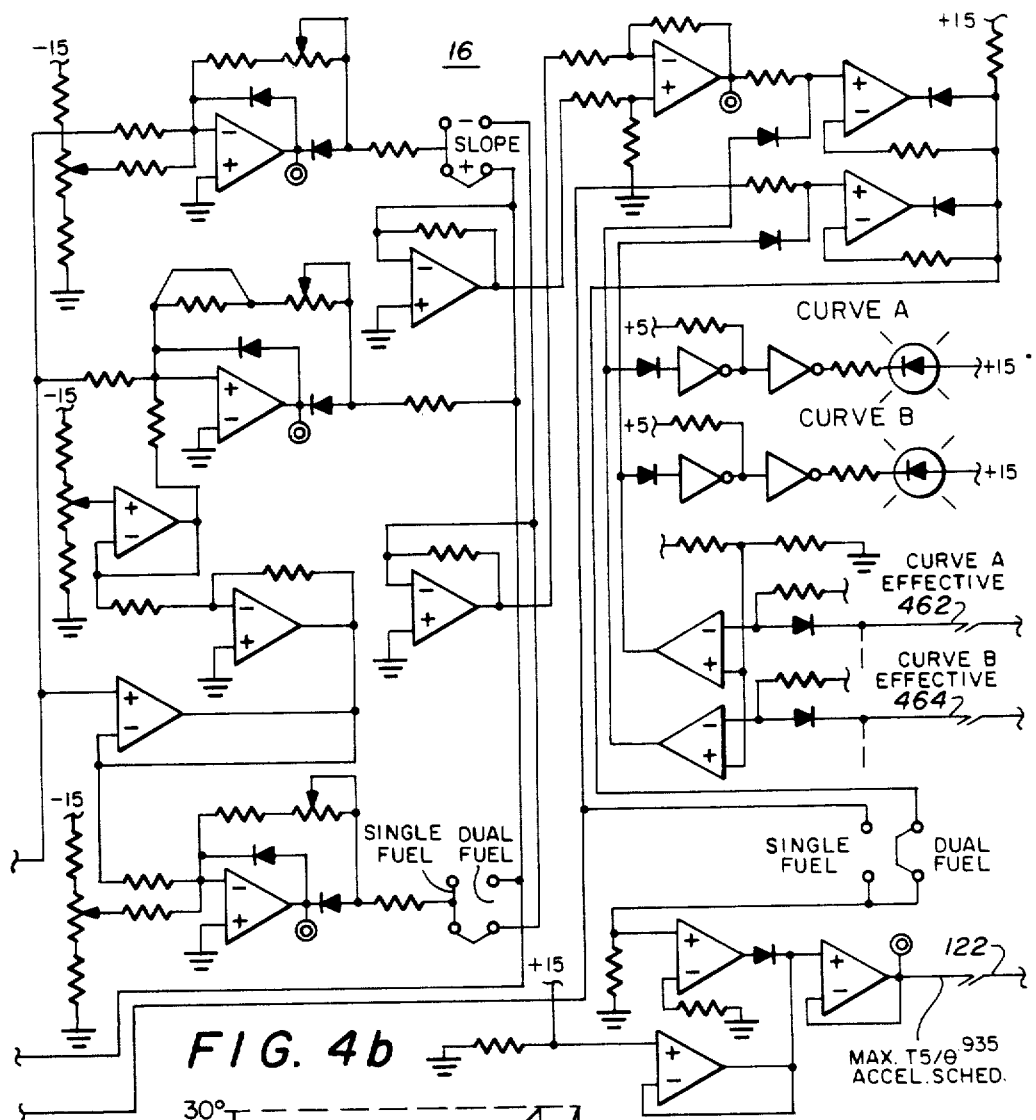

The T5 acceleration schedule card 16 is illustrated in FIGS. 4a and 4b. The T5 acceleration schedule curve is shown in FIG. 5. The input to card 14 is the signal NGG over the square root of $\theta$ at line 80. The selected output is the maximum T5 acceleration schedule at line 122. The selection of the A or B curve is determined by inputs from lines 462 and 464.

Figure 6B:
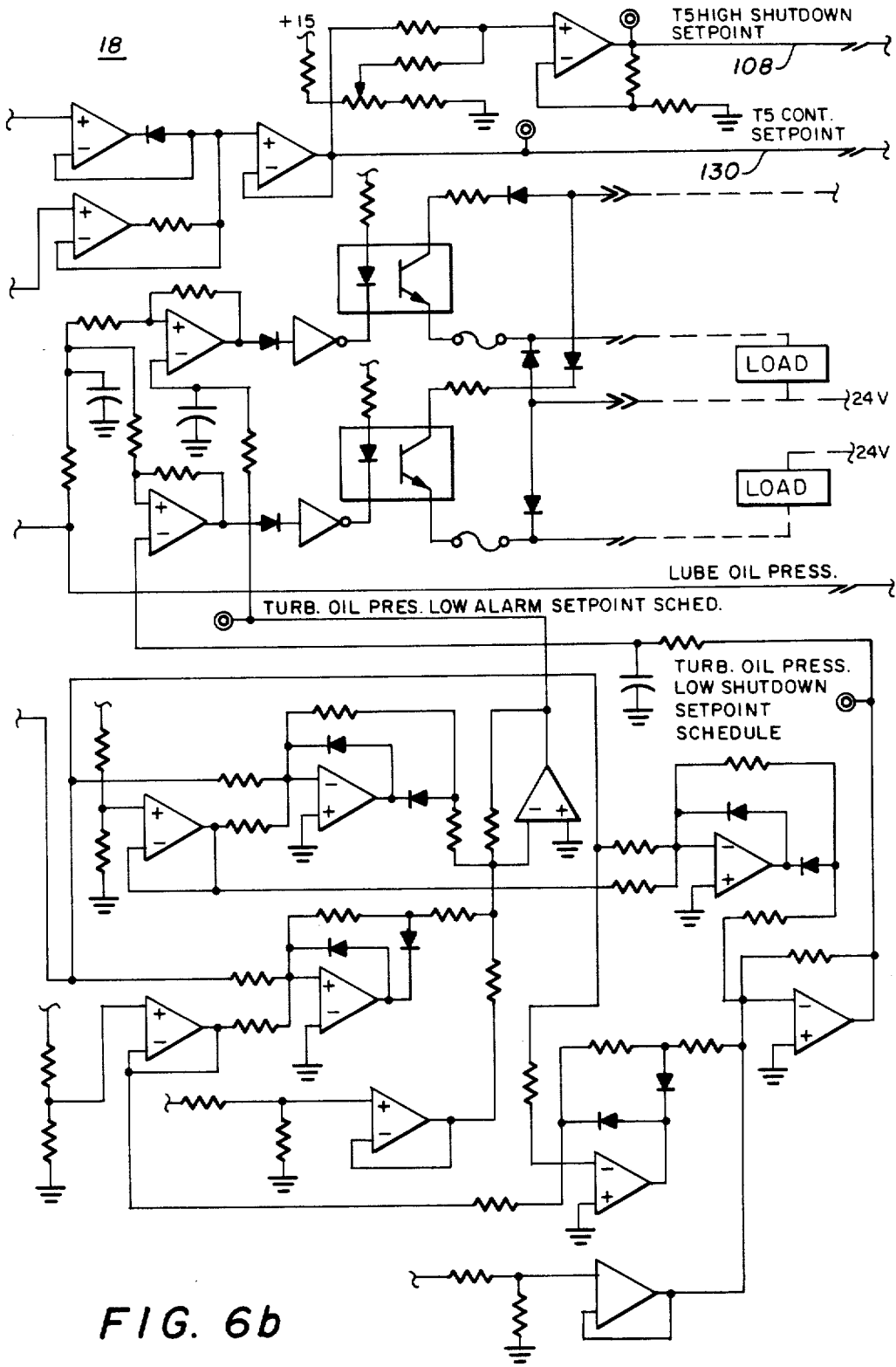

The T5 maximum schedule card 18 is described in detail in FIGS. 6a and 6b. The purpose of card 18 is to generate the T5 high shutdown setpoint signal at line 108 and the T5 control setpoint signal at line 130. The curves for these signals are shown in FIG. 7. The input signals to the card 18 are the max T5 over $\theta^{.935}$ acceleration schedule signal at line 122, the $\theta^{.935}$ power signal at line 78 and the $\theta$ signal at line 76.

Card 18 further has functions dealing with turbine oil pressure. These functions are not related to the control of the fuel valve other than causing a shutdown when there is insufficient pressure as shown in FIG. 8.

The card 18 also includes a multiplier 462 which produces the T5 signal at the output thereof. Multiplier 462 is preferably a model AD534LD manufactured by Analog Devices.

Figure 9A:
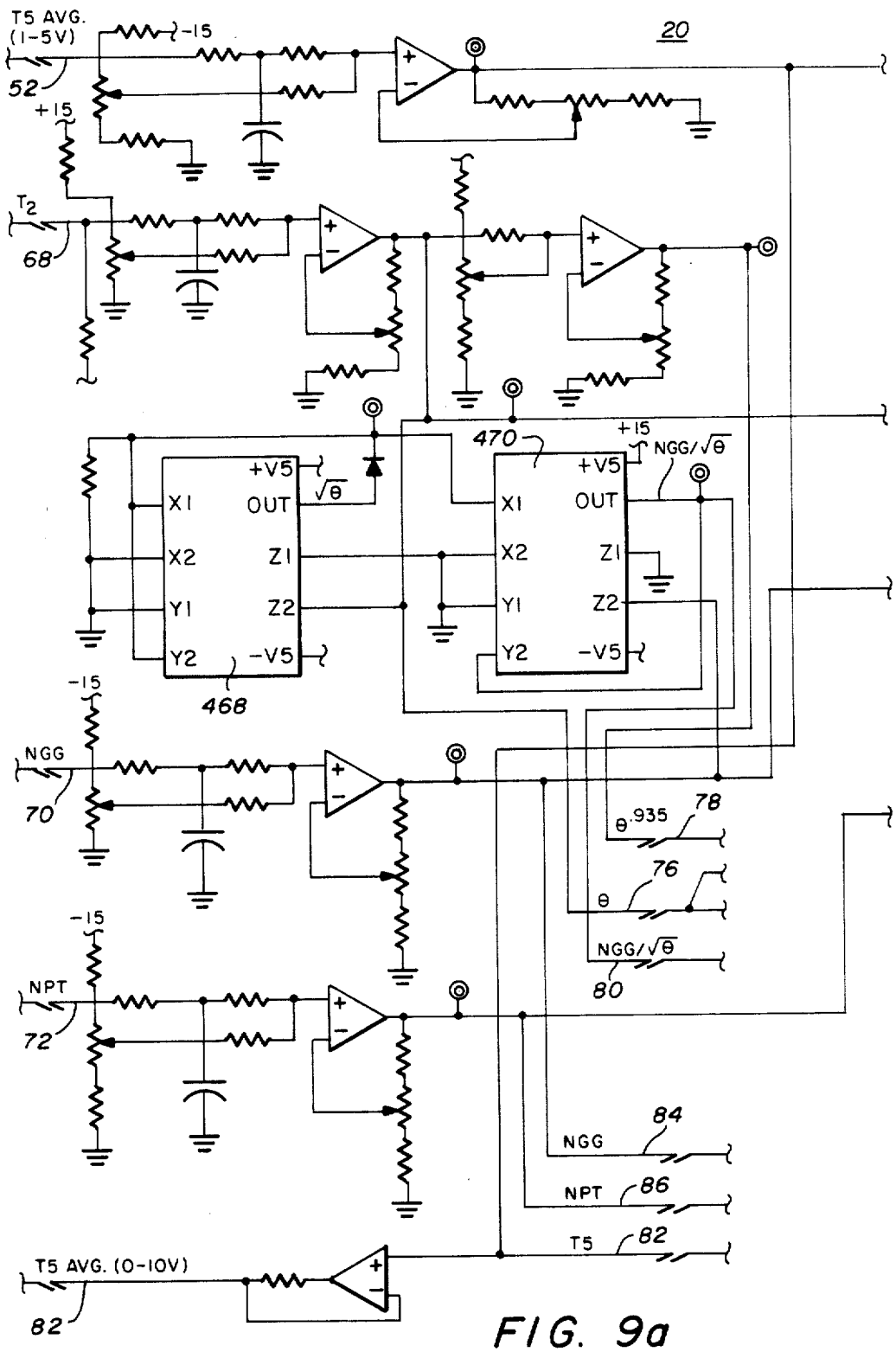
FIGS. 9a and 9b are schematic illustrations of the input signals level conversion and switch logic card as shown in FIGS. 1c–1c.
Figure 9B:
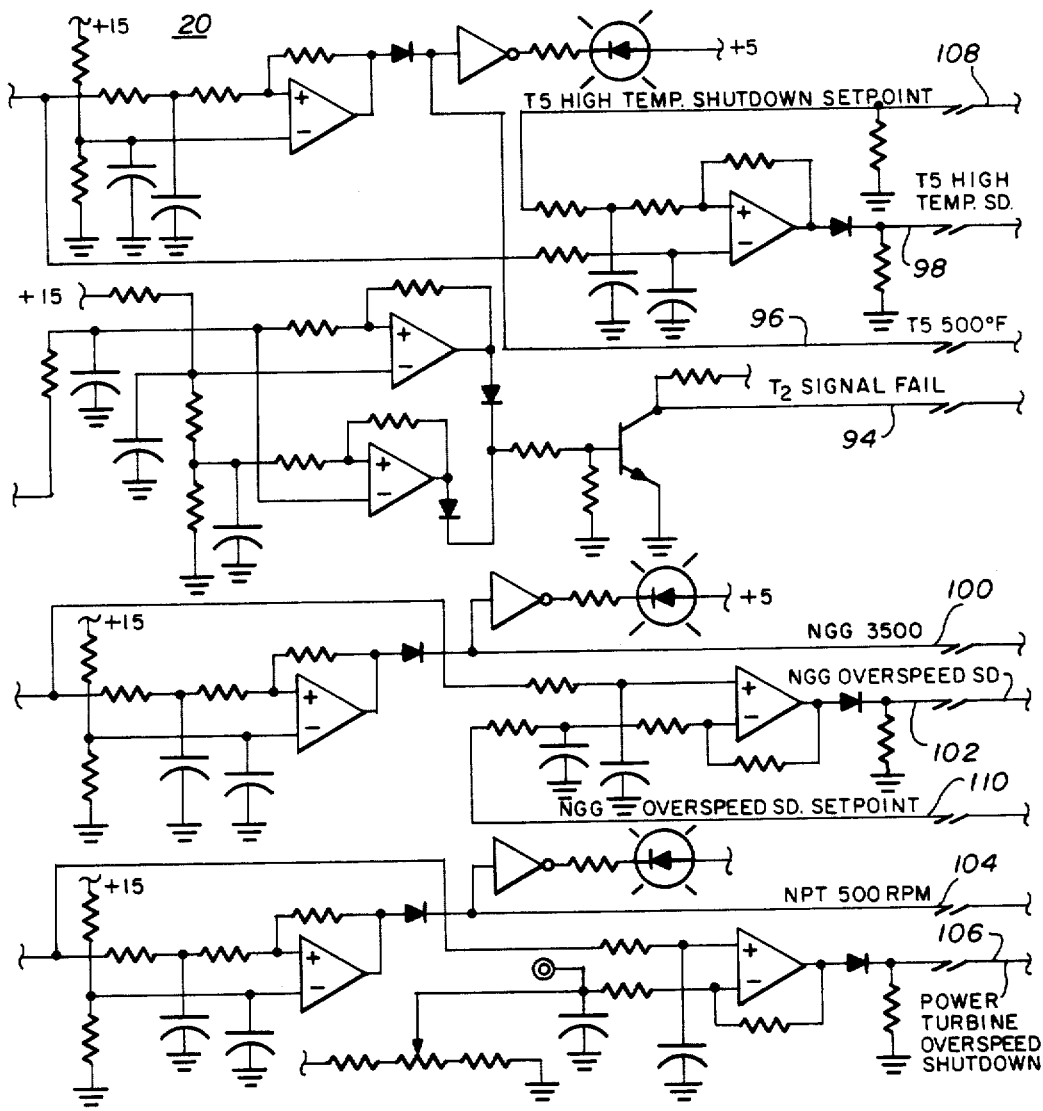

The input signals level conversion and switch logic card 20 is illustrated in detail in FIGS. 9a and 9b. The purpose of card 20 is to convert the 1-5 volt input signals to 0-10 volts signals for internal use. Card 20 further serves to generate a number of switch signals to indicate the status of the operation of the gas turbine engine.

The card 20 includes two multipliers 468 and 470 which serve to respectively produce the square root of the $\theta$ signal and the NGG over the square root of $\theta$ signal. Each of these multipliers is preferably a model AD534LD manufactured to Analog Devices.

Figure 10:
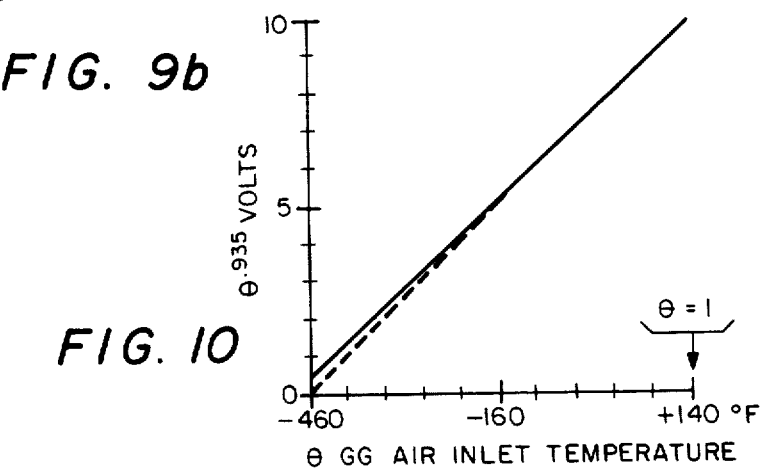
FIG. 10 is a graph of the function $\theta^{.935}$ as a function of the gas generator air inlet temperature.

Card 20 also produces the $\theta$ to the 0.935 power signal. A graph illustrating this mathematical function is shown in FIG. 10.

Figure 11A:
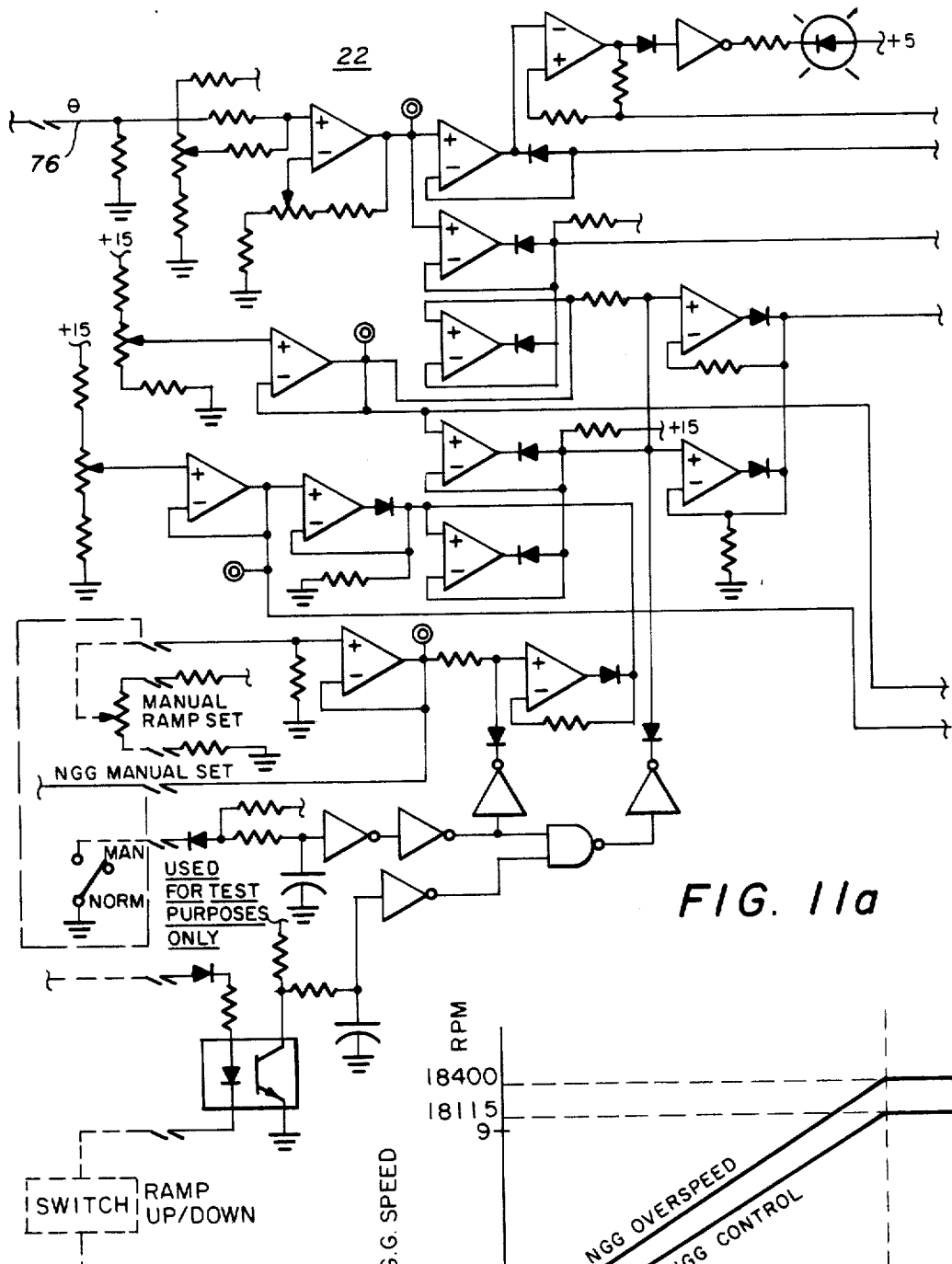
FIGS. 11a and 11b are schematic illustrations of the gas generator speed setpoint card shown in FIGS. 1a–1c.
Figure 11B:
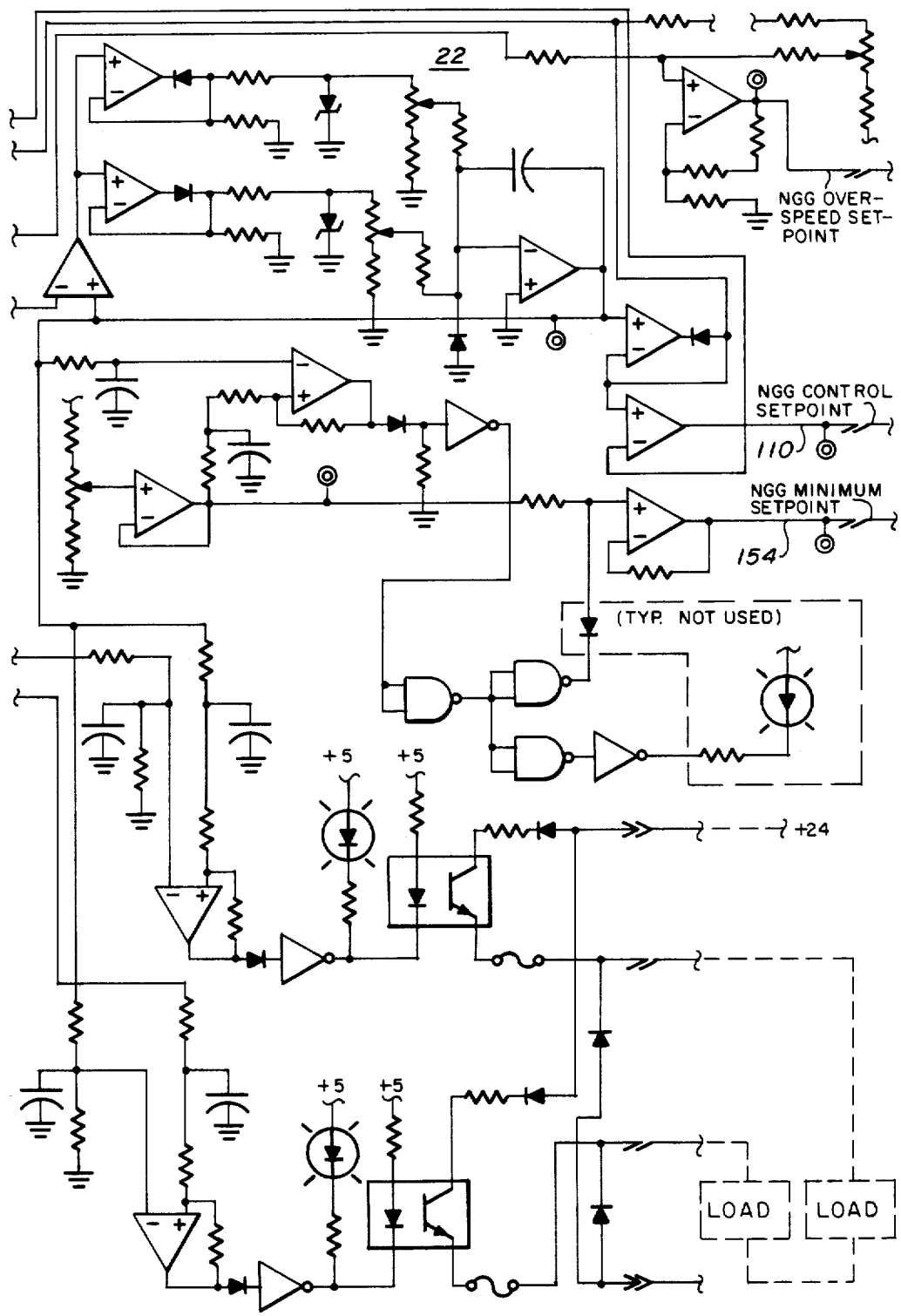

The gas generator speed setpoint card 22 is illustrated as a schematic diagram in FIGS. 11a and 11b. The purpose of this card is to generate the gas generator overspeed setpoint signal at line 110, the gas generator control setpoint signal at line 154 and the gas generator minimum control setpoint signal at line 156. Various inputs to this card are shown in FIGS. 11a and 11b and correspond to the same inputs described in reference to this card in FIGS. 1a-c.

The curves for the control signals generated by the gas generator speed setpoint card 22 are shown in FIG. 12.

Figure 13A:
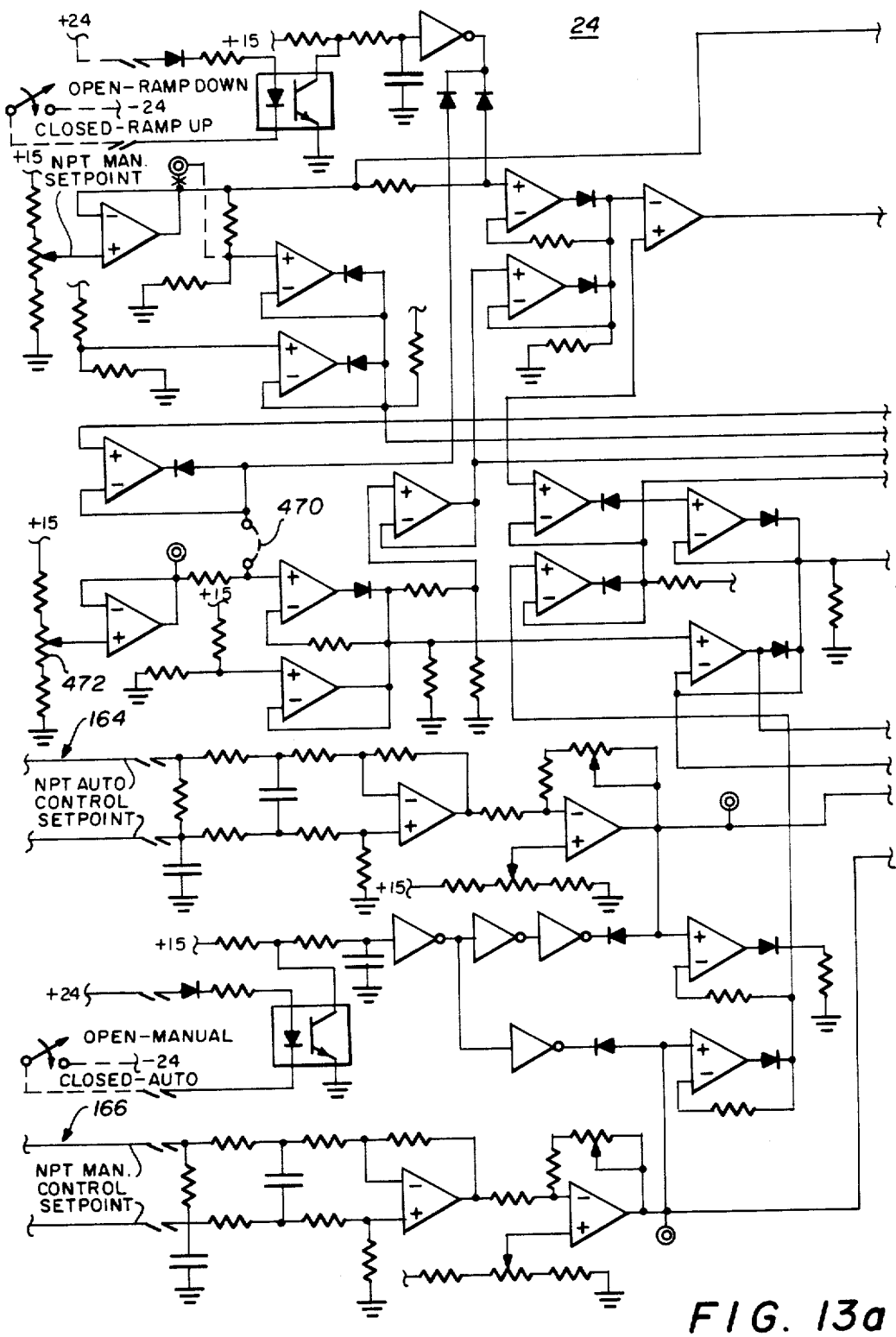
FIGS. 13a and 13b are schematic illustrations of the power turbine speed setpoint card shown in FIGS. 1a–1c.
Figure 13B:
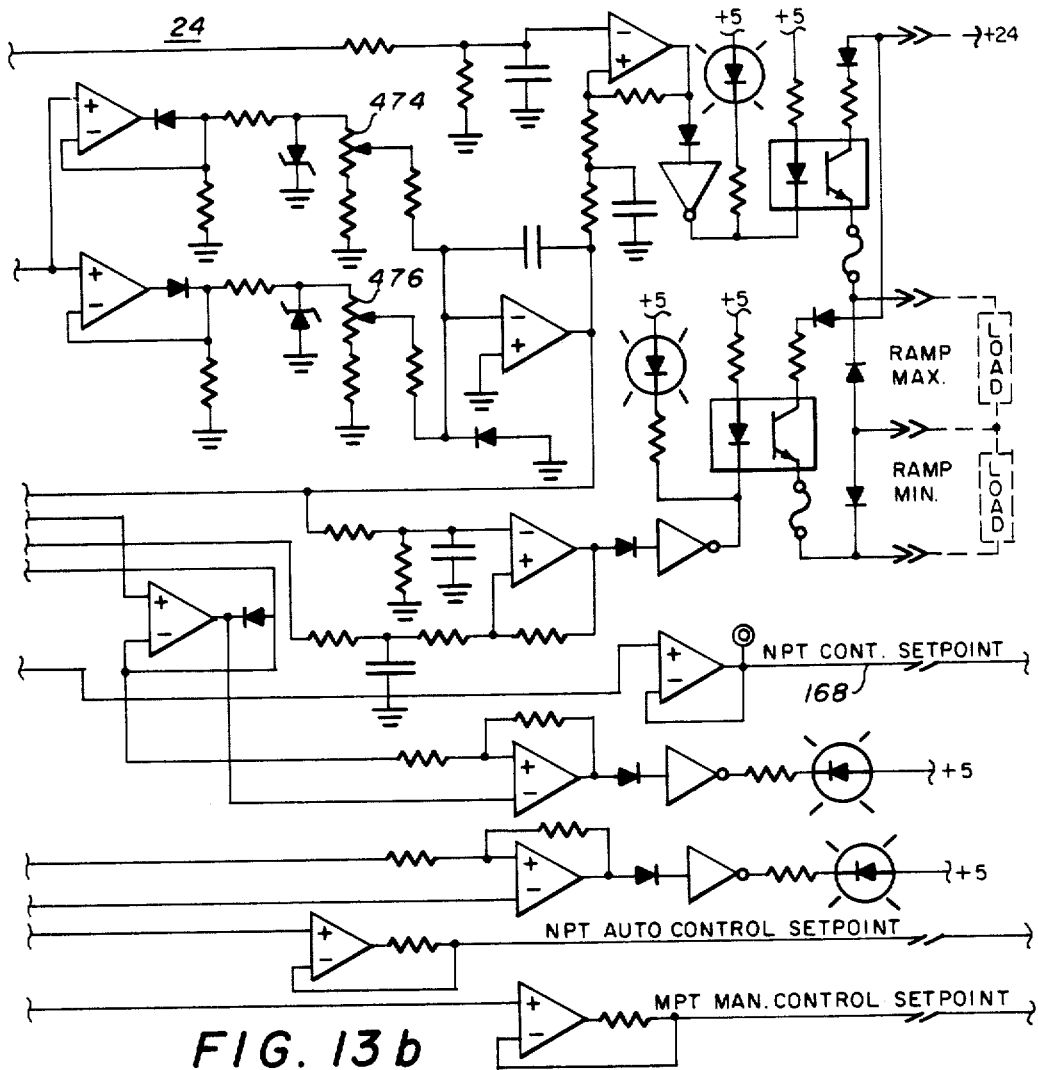

The power turbine speed setpoint card 24 is illustrated as a schematic diagram in FIGS. 13a and 13b. The purpose of card 24 is to generate the power turbine control setpoint signal at line 168. This signal is generated in response to a number of input signals as shown for card 24 in FIGS. 1a-c. Card 24 includes a jumper 470 which is installed to provide a turbine warmup at a fixed minimum speed. When the jumper is not installed there is provided a warmup at an adjustable minimum speed. A potentiometer 472 provides an adjustable turbine speed minimum setpoint. A potentiometer 474 is provided to control the ramp up rate and a potentiometer 467 is adjustable to control the ramp down rate.

Figure 14A:
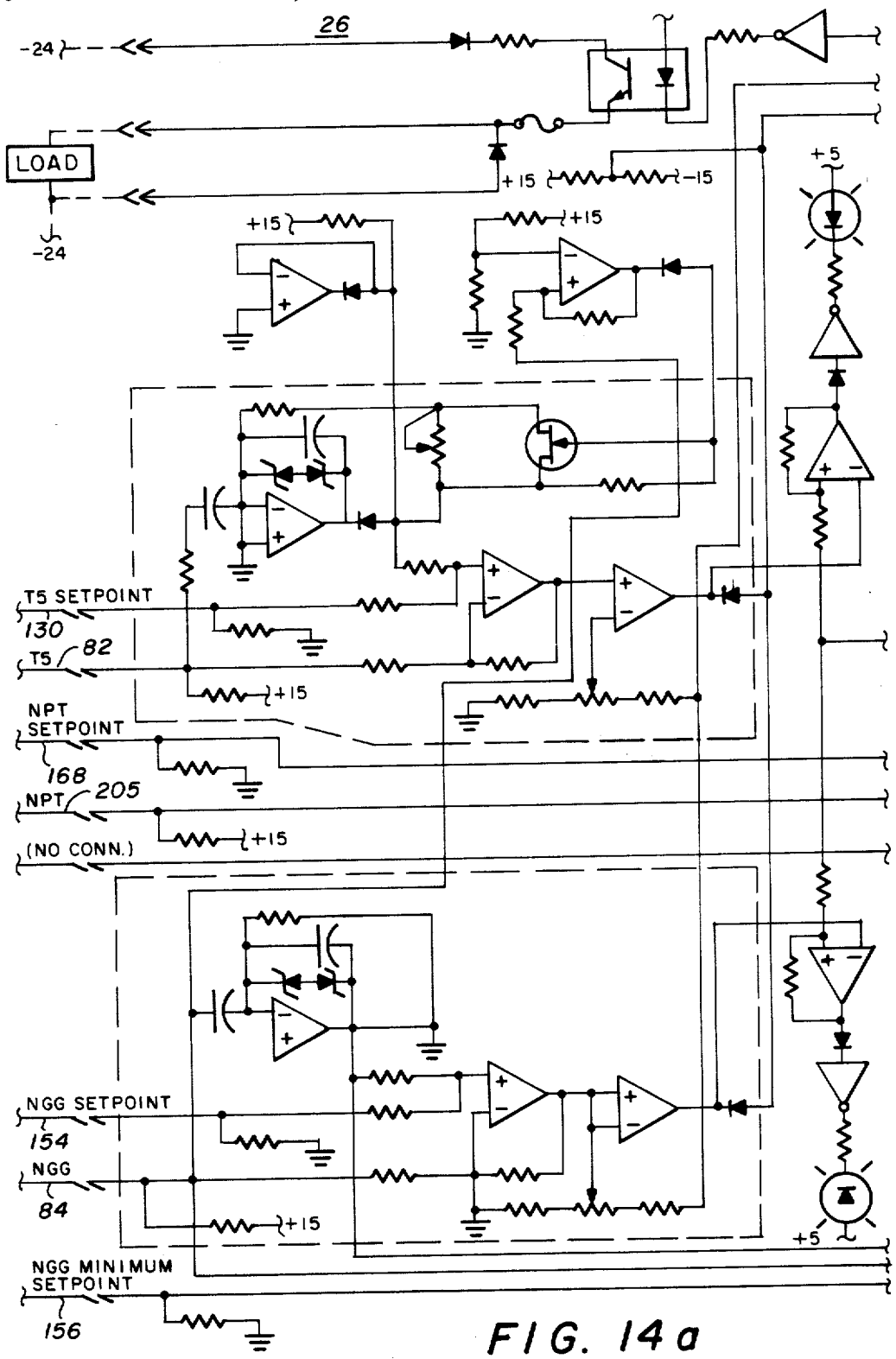
FIGS. 14a and 14b are a schematic illustration of the control card shown in FIGS. 1a–1c.
Figure 14B:
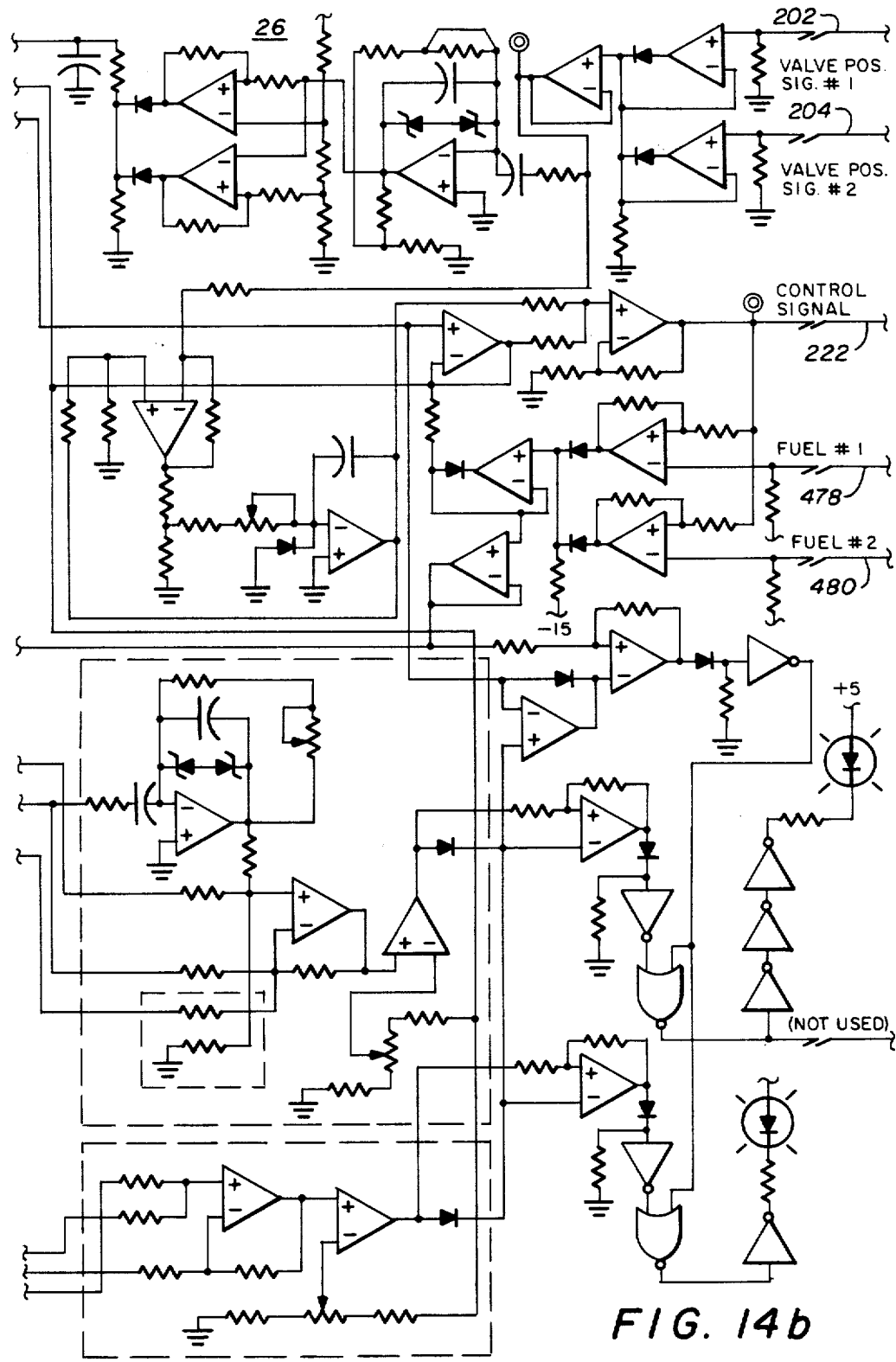

The control card 26 is illustrated in schematic diagram form in FIGS. 14a and 14b. The purpose of this card is to generate the fuel position control signal at line 222 in response to the various setpoint and signal inputs. As described above, with one exception, the card 26 selects the control signal which calls for the minimum fuel consumption for driving the fuel control valve. A fuel number 1 signal at a line 478 is input from the fuel valve card 28. A corresponding fuel number 2 signal is input at a line 480 from the fuel valve card 32. The purpose of these signals is to indicate whether the control signal at line 222 is effective to control at either fuel valve card 28 or 32 for the light logic.

Figure 15A:
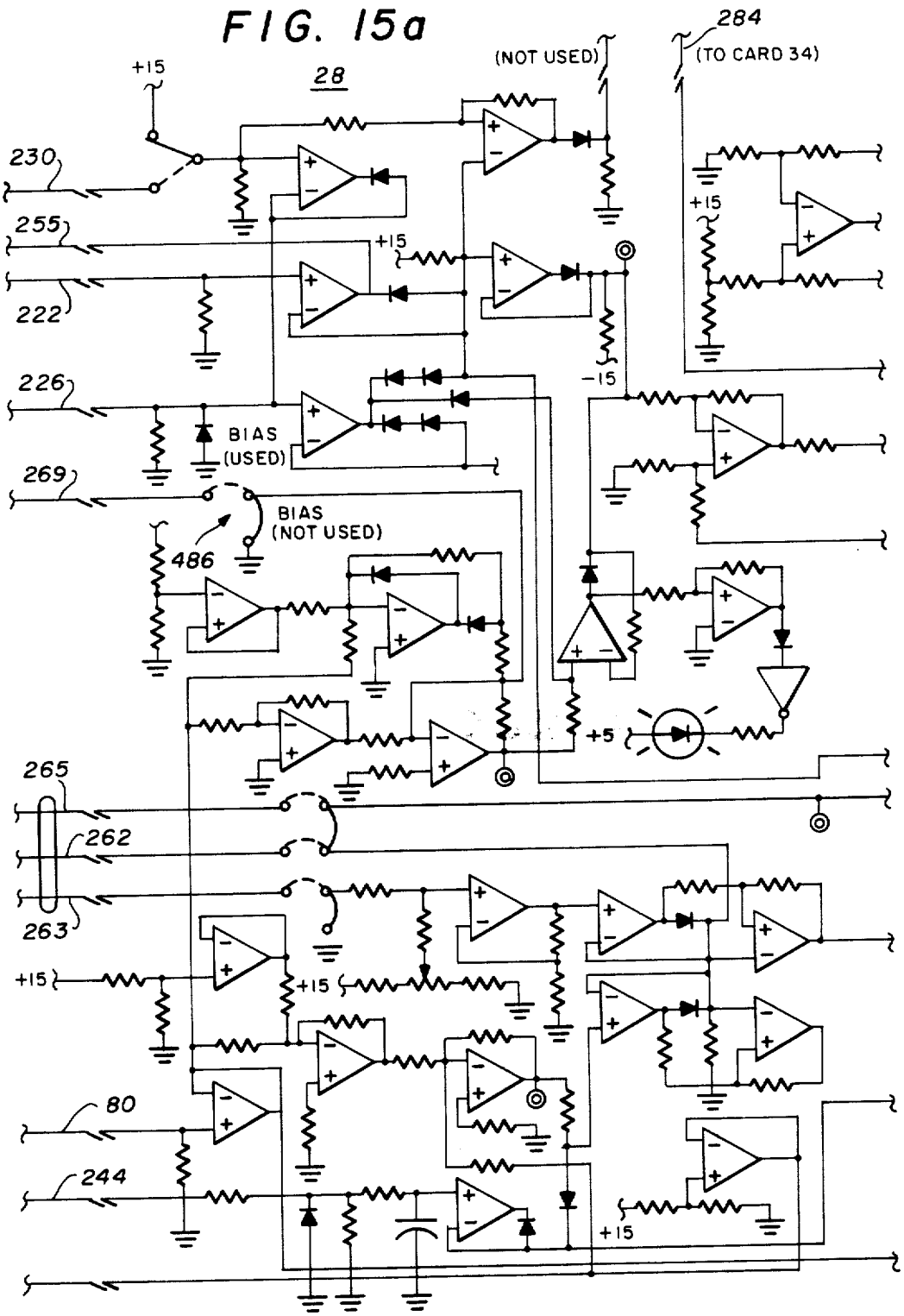
FIGS. 15a and 15b are a schematic illustration of the fuel valve card shown in FIGS. 1a–1c.
Figure 15B:
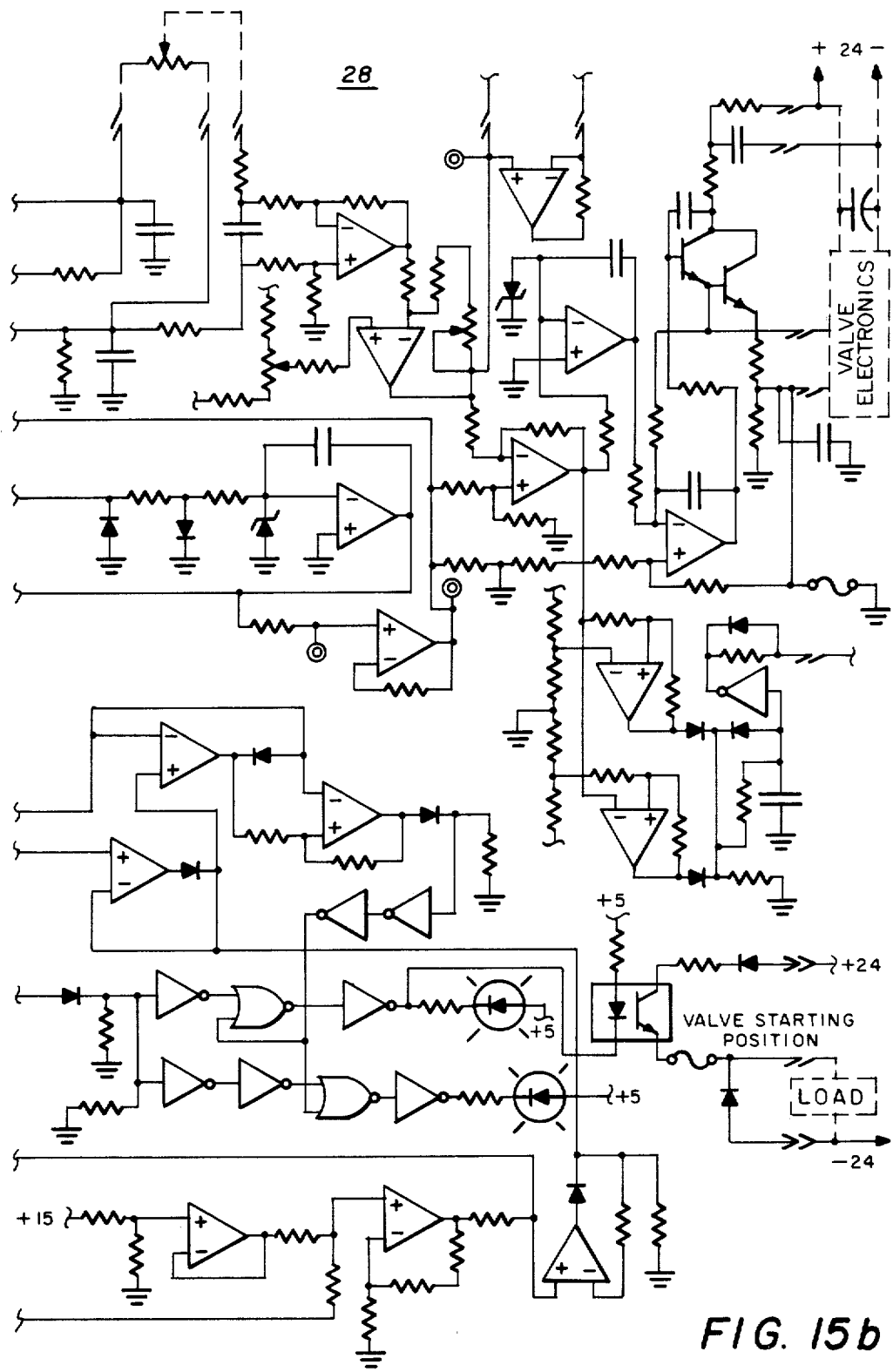

The fuel valve card 28 is illustrated as a schematic diagram in FIGS. 15a and 15b. Card 28 receives the valve control signal through line 222 from card 26 and through various internal processing produces the control signal to the valve through line 284. Card 28 includes a jumper 486 which is installed in one of two positions as shown to implement the bias voltage produced by the card 30. The card 28 further includes a valve max speed integrator to control the rate of response to driving the fuel control valve. There is also included a feedback loop for insuring that the fuel valve is driven to the desired setting. A valve fail detect circuit 300 is included to detect if there is a failure of the driving mechanism for the valve or the valve itself. A failure detected by the detect circuit 300 causes a shutdown of the system.

The card 28 further provides for limitations on the maximum and minimum valve position by operation of predetermined curves which are a function of signals produced by the signal card 20.

Figure 16A:
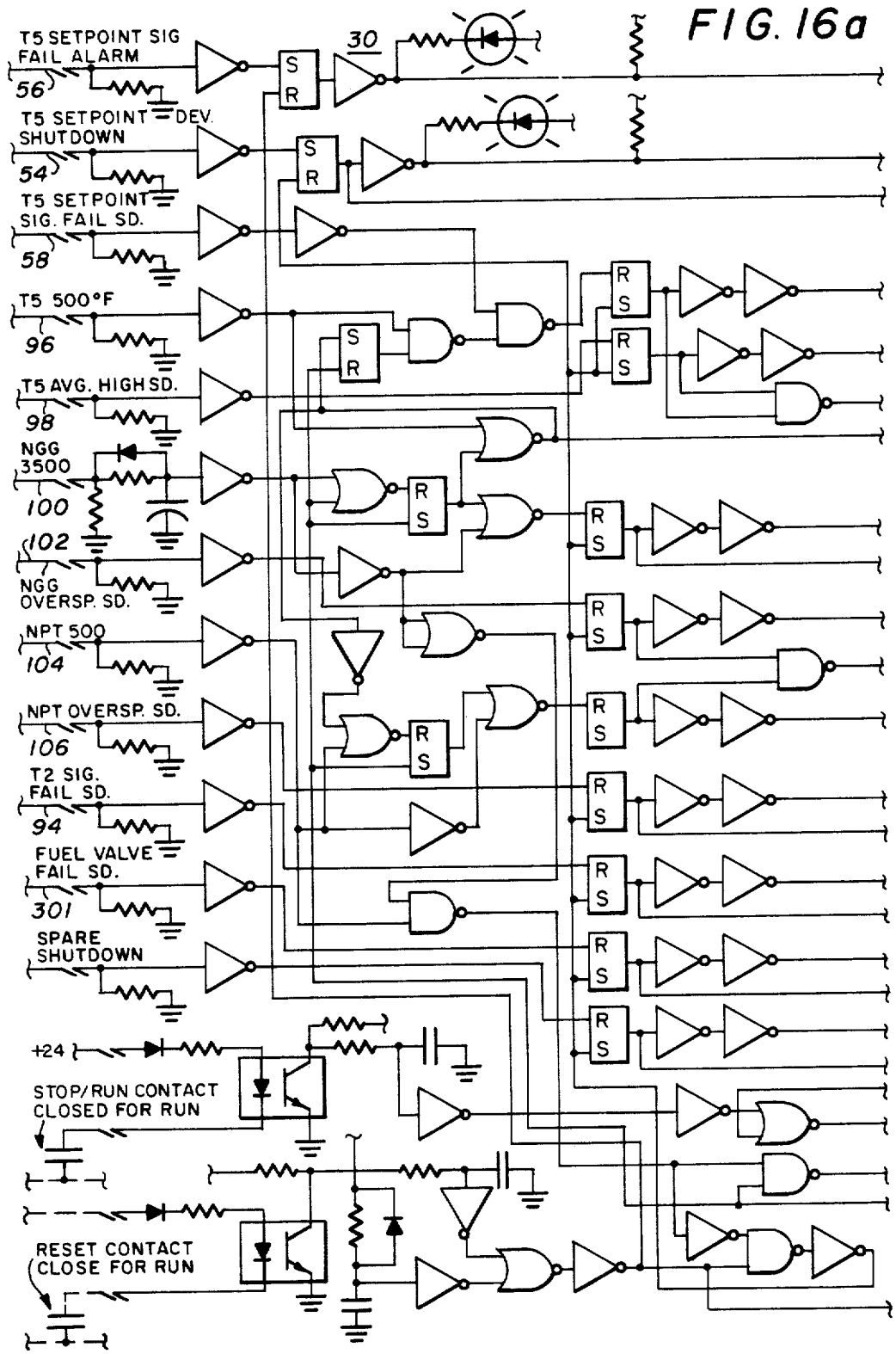
FIGS. 16a and 16b are schematic illustrations of the alarm shutdown card shown in FIGS. 1a–1c.
Figure 16B:
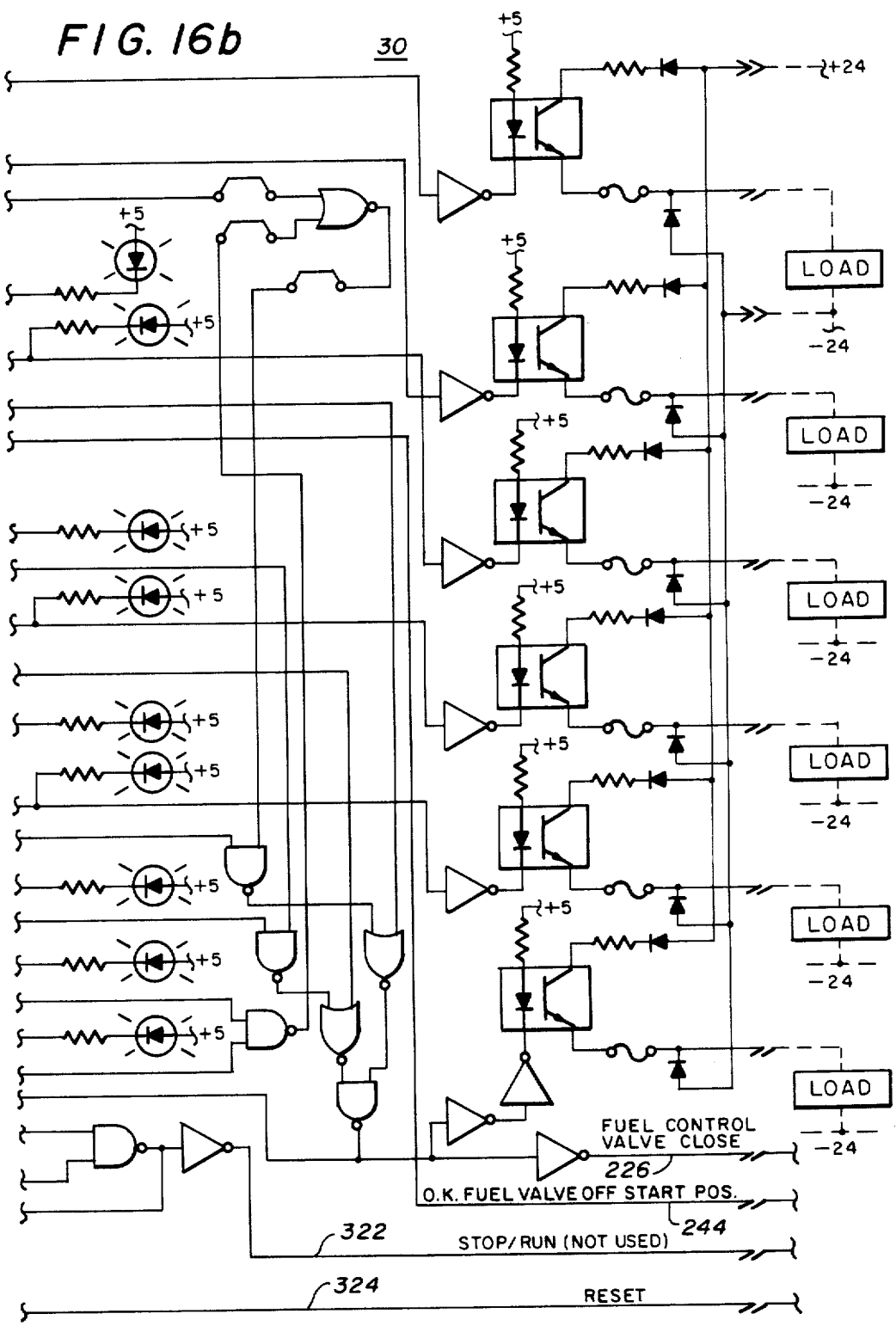

The alarm shutdown card 30 is shown as a schematic illustration in FIGS. 16a and 16d. The purpose of the alarm shutdown card 30 is to apply a fuel control valve close signal at line 226 when a failure condition is detected, send a shutdown signal to the control panel and allow the fuel valve to open beyond the start position. The inputs to the card 30 shown in FIGS. 16a and 16b correspond to those shown for card 30 in FIGS. 1a-c. The card 30 includes logic units to produce the switch outputs as required.

Figure 17:
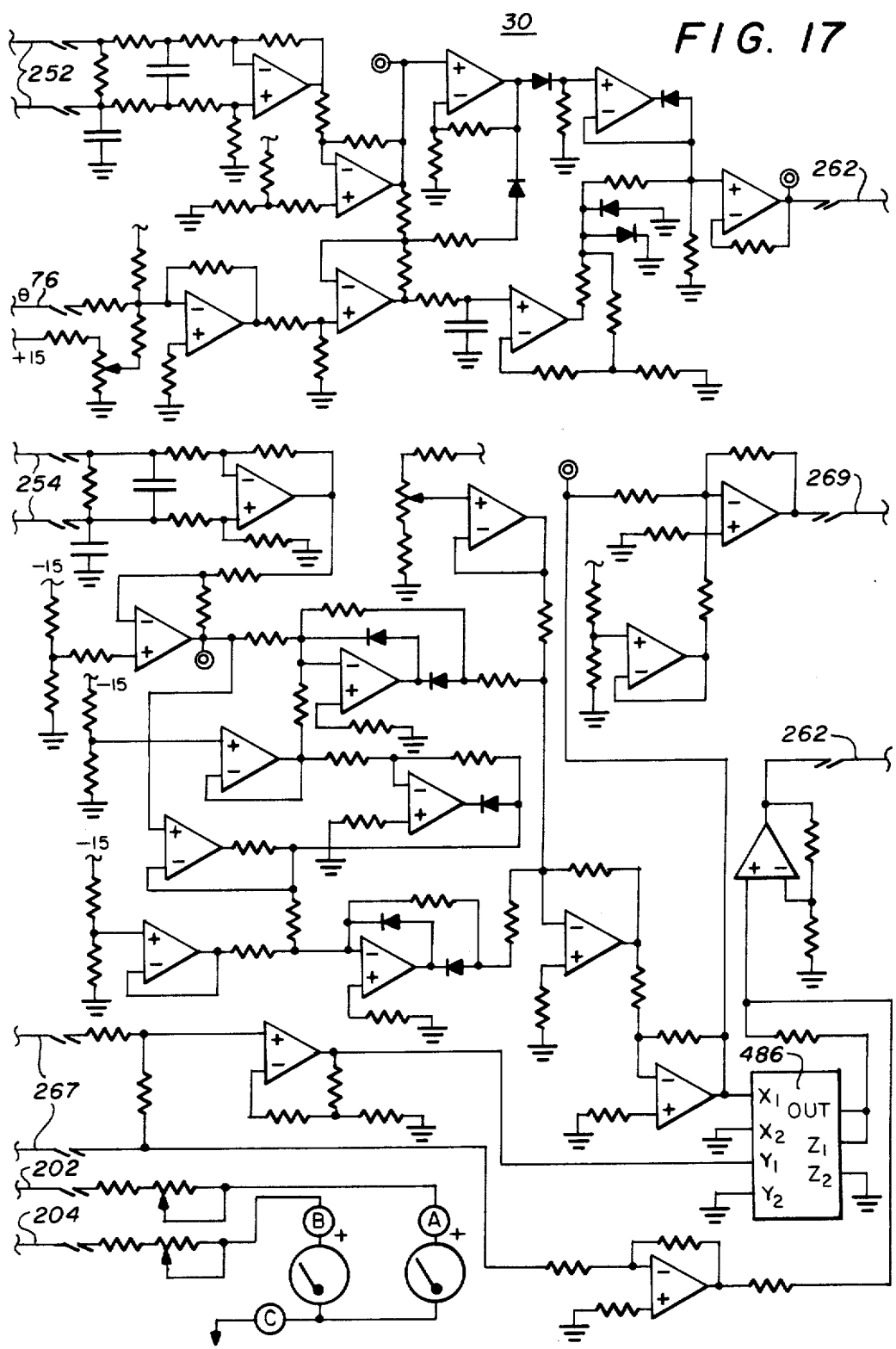
FIG. 17 is a schematic illustration of the fuel valve auxilliary signal card shown in FIGS. 1a–1c.

The fuel valve auxiliary signal card 30 is illustrated as a schematic diagram in FIG. 17. One purpose of this card is to provide a controlled valve setting at ignition for a given nozzle pressure differential. It further provides a low fuel pressure compensation bias to the valve position curves in the valve fuel cards 28.

The inputs and outputs to card 17 are labeled according to the similar outputs shown in FIGS. 1a, 1b and 1c. Card 30 further includes a multiplier circuit 486 which is preferably a model AD534LD manufactured by Analog Devices.

Figure 18:
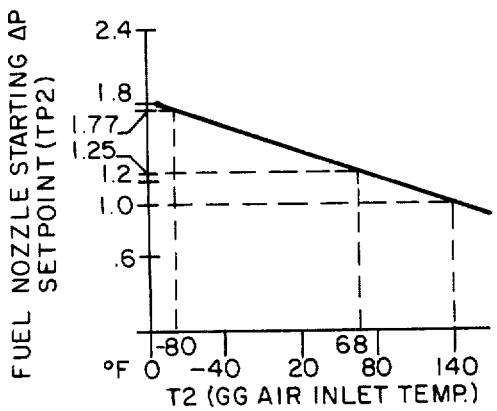
FIG. 18 is a graph of fuel nozzle starting $\Delta$P setpoint as a function of gas generator air inlet temperature.

FIG. 18 is a curve illustrating the fuel nozzle starting Δ pressure setpoint as a function of the gas generator air inlet temperature. This is associated with the function of card 30 shown in FIG. 17.

Figure 19:
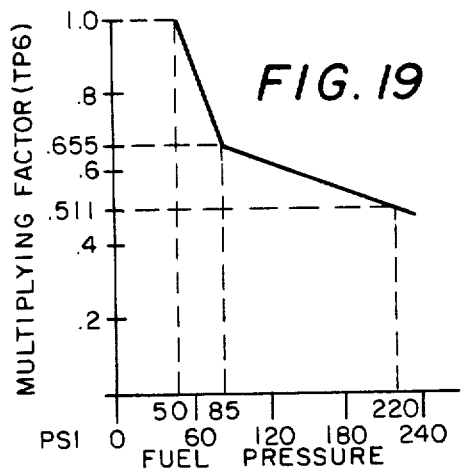
FIG. 19 is a graph of multiplying factor to change the slope of the fuel valve max position line as a function of fuel supply pressure.

FIG. 19 is a graph illustrating the multiplying factor bias applied to the fuel pressure curves in the fuel valve card 28 as a function of the fuel pressure. This is a function provided by card 30 shown in FIG. 17.

FIG. 20 is a graph illustrating fuel valve minimum and maximum angular settings as a function of NGG and gas generator inlet temperature.

In summary the present invention comprises an electronic fuel control system for a gas turbine to control the rate of supply of fuel to the turbine in response to numerous load, temperature and operating constraints. The system comprises a feedback stabilized loop which includes a number of predetermined operating curves for maintaining the speed and temperatures of the turbine within desired limits. All system discrete inputs and outputs are transmitted through optical isolators to avoid system loading and eliminate undesirable effects due to transient signals.

Although one embodiment of the invention has been illustrated in the accompanying Drawings and described in the foregoing Detailed Description, it will be understood that the invention is not limited to the embodiment disclosed, but is capable of numerous rearrangements, modifications, substitutions without departing from the scope of the invention.

I claim:

1. An electronic engine control for operating a fuel valve of a gas turbine, comprising:
   means for monitoring a plurality of parameters for said gas turbine to produce a plurality of parameter signals,
   means for generating a setpoint signal for each of said parameter signals,
   means for comparing each of said parameter signals with the respective setpoint signals to produce a control signal,
   means connected to receive said control signal and at least one alternate condition control signal for amplitude selecting one of said control signals,
   means for integrating said selected control signal to produce an integrated control signal,
   a summation circuit having a first input connected to receive said integrated control signal and produce a fuel valve control signal for setting the position of said fuel valve,
   means for monitoring said fuel valve position to produce a valve position signal,
   a differential amplifier having the first input thereof connected to receive said integrated control signal and the second input thereof connected to receive said valve position signal, said amplifier producing a differential output signal,
   means for integrating said differential output signal and supplying said integrated differential output signal to the second input of said summation circuit, and
   means connected to receive said differential output signal for generating a failure signal when said differential output signal has been offset from a set amplitude for more than a predetermined time.

2. An electronic engine control as recited in claim 1 including:
   means for driving said fuel valve to an off position upon the generation of said failure signal.

3. A method for operating a fuel valve of a gas turbine, comprising the steps of:
   generating a parameter signal for each of a plurality of gas turbine parameters,
   generating a respective setpoint signal for each of said parameter signals,
   comparing each of said parameter signals to the corresponding setpoint signal to produce a control signal,
   amplitude selecting from one of either said control signal or at least one alternate control signal,
   integrating said selected control signal to produce an integrated control signal,
   summing said integrated control signal with an integrated valve position signal to produce a fuel valve control signal,
   generating a valve position signal proportional to the position setting of said fuel valve,
   generating a differential output signal proportional to the difference between said integrated control signal and said valve position signal,
   integrating said differential output signal to produce said integrated valve position signal, and
   generating a failure signal when said differential output signal has been offset from a set amplitude for more than a predetermined time.

4. A method as recited in claim 3 including the step of:
   driving said fuel valve to an off position upon the generation of said failure signal.

5. A method as recited in claim 3 wherein the step of generating a failure signal comprises generating said failure signal when said differential output signal has been in a non-null state for more than a predetermined time.

* * * * *